US008684157B2

(12) United States Patent
Freeman et al.

(10) Patent No.: US 8,684,157 B2
(45) Date of Patent: Apr. 1, 2014

(54) CURRENCY DISCRIMINATION SYSTEM AND METHOD

(71) Applicant: Cummins-Allison Corp., Mr. Prospect, IL (US)

(72) Inventors: Jay D. Freeman, Encenitas, CA (US); Tomasz M. Jagielinski, Carlsbad, CA (US); Frederick J. Jeffers, Escondido, CA (US); George S. Krastev, Santee, CA (US); Danny D. Yang, San Diego, CA (US)

(73) Assignee: Cummins-Allison Corp., Mount Prospect, IL (US)

( * ) Notice: Subject to any disclaimer, the term of this patent is extended or adjusted under 35 U.S.C. 154(b) by 0 days.

(21) Appl. No.: 13/677,985

(22) Filed: Nov. 15, 2012

(65) Prior Publication Data

US 2013/0068585 A1 Mar. 21, 2013

Related U.S. Application Data

(60) Division of application No. 12/819,579, filed on Jun. 21, 2010, now Pat. No. 8,322,505, which is a continuation of application No. 11/716,182, filed on Mar. 9, 2007, now Pat. No. 7,762,380.

(60) Provisional application No. 60/781,286, filed on Mar. 9, 2006.

(51) Int. Cl.

| | |
|---|---|
| ***G07F 7/04*** | (2006.01) |
| ***G07F 7/10*** | (2006.01) |
| ***G06K 7/08*** | (2006.01) |

(52) U.S. Cl.
USPC ............ 194/210; 902/27; 382/135; 382/320; 235/449

(58) Field of Classification Search
USPC ...................... 194/206, 210, 213; 283/82, 57; 209/534; 235/379, 380, 449; 902/27
See application file for complete search history.

(56) References Cited

U.S. PATENT DOCUMENTS

| | | | | |
|---|---|---|---|---|
| 4,399,553 | A | 8/1983 | Toyama | 382/7 |
| 4,518,919 | A | 5/1985 | Ishida | 324/228 |
| 5,140,368 | A | 8/1992 | Szlucha | 355/202 |
| 5,163,672 | A | 11/1992 | Mennie | 271/187 |
| 5,207,788 | A | 5/1993 | Geib | 271/122 |
| 5,266,786 | A * | 11/1993 | Mazumder | 235/449 |
| 5,295,196 | A | 3/1994 | Raterman et al. | 382/135 |
| 5,467,405 | A | 11/1995 | Raterman et al. | 382/135 |
| 5,467,406 | A | 11/1995 | Graves et al. | 382/135 |
| D369,984 | S | 5/1996 | Larsen | D10/97 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |

(Continued)

FOREIGN PATENT DOCUMENTS

| | | | | |
|---|---|---|---|---|
| CA | 2 624 638 | A1 | 12/2007 | B65H 29/12 |
| CA | 2 684 159 | A1 | 4/2010 | G07D 11/00 |

(Continued)

*Primary Examiner* — Mark Beauchaine
(74) *Attorney, Agent, or Firm* — Nixon Peabody LLP

(57) ABSTRACT

According to some embodiments of the invention, a magnetic sensor having a track width of greater than about 50 millimeters is provided. The magnetic sensor is adapted to detect a magnetic feature and produce a linear, analog output in response to the magnetic feature. The analog output is along a single data channel.

18 Claims, 11 Drawing Sheets

(56) References Cited

U.S. PATENT DOCUMENTS

| | | | | |
|---|---|---|---|---|
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,761,089 | A | 6/1998 | McInerny | 364/550 |
| 5,790,693 | A | 8/1998 | Graves et al. | 382/135 |
| 5,790,697 | A | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,943,655 | A | 8/1999 | Jacobsen | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,139,065 | A | 10/2000 | Washburn et al. | 283/67 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/135 |
| 6,798,899 | B2 | 9/2004 | Mennie et al. | 382/135 |
| 6,810,137 | B2 | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 | 3/2006 | Jones et al. | 700/224 |
| 7,036,651 | B2 | 5/2006 | Tam et al. | 194/217 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 7,349,566 | B2 | 3/2008 | Jones et al. | 382/139 |
| 7,362,891 | B2 | 4/2008 | Jones et al. | 382/135 |
| 7,366,338 | B2 | 4/2008 | Jones et al. | 382/135 |
| 7,391,897 | B2 | 6/2008 | Jones et al. | 382/135 |
| 7,505,831 | B2 | 3/2009 | Jones et al. | 700/224 |
| 7,536,046 | B2 | 5/2009 | Raterman et al. | 382/135 |
| 7,542,598 | B2 | 6/2009 | Jones et al. | 382/135 |
| 7,551,764 | B2 | 6/2009 | Chiles et al. | 382/135 |
| 7,590,274 | B2 | 9/2009 | Raterman et al. | 382/135 |
| 7,591,428 | B2 | 9/2009 | Freeman et al. | 235/449 |
| 7,599,543 | B2 | 10/2009 | Jones et al. | 382/137 |
| 7,600,626 | B2 | 10/2009 | Hallowell et al. | 194/206 |
| 7,602,956 | B2 | 10/2009 | Jones et al. | 382/135 |
| 5,909,503 | C1 | 11/2009 | Graves et al. | 382/135 |
| 7,619,721 | B2 | 11/2009 | Jones et al. | 356/71 |
| 7,620,231 | B2 | 11/2009 | Jones et al. | 382/137 |
| 5,966,456 | C1 | 12/2009 | Jones et al. | 382/135 |
| 6,381,354 | C1 | 12/2009 | Mennie et al. | 382/135 |
| 7,628,326 | B2 | 12/2009 | Freeman et al. | 235/450 |
| 7,635,082 | B2 | 12/2009 | Jones | 235/379 |
| 7,647,275 | B2 | 1/2010 | Jones | 705/40 |
| 7,650,980 | B2 | 1/2010 | Jenrick et al. | 194/206 |
| 7,672,499 | B2 | 3/2010 | Raterman et al. | 382/135 |
| 7,686,151 | B2 | 3/2010 | Renz et al. | 194/206 |
| 7,726,457 | B2 | 6/2010 | Maier et al. | 194/206 |
| 7,735,621 | B2 | 6/2010 | Hallowell et al. | 194/206 |
| 7,753,189 | B2 | 7/2010 | Maier et al. | 194/206 |
| 7,762,380 | B2 | 7/2010 | Freeman et al. | 194/210 |
| 7,778,456 | B2 | 8/2010 | Jones et al. | 382/135 |
| 7,779,982 | B2 | 8/2010 | Fitzgerald et al. | 194/206 |
| 2001/0006557 | A1 | 7/2001 | Mennie et al. | 382/135 |
| 2001/0015311 | A1 | 8/2001 | Mennie | 194/207 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |

(56) References Cited

U.S. PATENT DOCUMENTS

| | | | | |
|---|---|---|---|---|
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2003/0202690 | A1 | 10/2003 | Jones et al. | 382/139 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0173432 | A1 | 9/2004 | Jones | 194/216 |
| 2004/0182675 | A1 | 9/2004 | Long et al. | 194/206 |
| 2004/0251110 | A1 | 12/2004 | Jenrick et al. | 194/207 |
| 2005/0029168 | A1 | 2/2005 | Jones et al. | 209/534 |
| 2005/0035034 | A1 | 2/2005 | Long et al. | 209/534 |
| 2005/0040225 | A1 | 2/2005 | Csulits et al. | 235/379 |
| 2005/0047642 | A1 | 3/2005 | Jones et al. | 382/137 |
| 2005/0060055 | A1 | 3/2005 | Hallowell et al. | 700/95 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1 | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0078186 | A1 | 4/2006 | Freeman et al. | 382/135 |
| 2006/0182330 | A1 | 8/2006 | Chiles | 382/135 |
| 2006/0195567 | A1 | 8/2006 | Mody et al. | 709/224 |
| 2006/0210137 | A1 | 9/2006 | Raterman et al. | 382/135 |
| 2006/0274929 | A1 | 12/2006 | Jones et al. | 382/135 |
| 2007/0071302 | A1 | 3/2007 | Jones et al. | 382/135 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones et al. | 705/45 |
| 2007/0122023 | A1 | 5/2007 | Jenrick et al. | 382/135 |
| 2007/0172107 | A1 | 7/2007 | Jones et al. | 382/137 |
| 2007/0209904 | A1 | 9/2007 | Freeman et al. | 194/210 |
| 2007/0221470 | A1 | 9/2007 | Mennie et al. | 194/216 |
| 2007/0237381 | A1 | 10/2007 | Mennie et al. | 382/135 |
| 2007/0258633 | A1 | 11/2007 | Jones et al. | 382/135 |
| 2007/0269097 | A1 | 11/2007 | Chiles et al. | 382/135 |
| 2007/0278064 | A1 | 12/2007 | Hallowell et al. | 194/206 |
| 2008/0006505 | A1 | 1/2008 | Renz et al. | 194/206 |
| 2008/0033829 | A1 | 2/2008 | Mennie et al. | 705/16 |
| 2008/0044077 | A1 | 2/2008 | Mennie et al. | 382/135 |
| 2008/0060906 | A1 | 3/2008 | Fitzgerald et al. | 194/207 |
| 2008/0123932 | A1 | 5/2008 | Jones et al. | 382/135 |
| 2008/0133411 | A1 | 6/2008 | Jones et al. | 705/42 |
| 2008/0177420 | A1 | 7/2008 | Klein et al. | 700/224 |
| 2008/0219543 | A1 | 9/2008 | Csulits et al. | 382/135 |
| 2008/0285838 | A1 | 11/2008 | Jones et al. | 382/135 |
| 2009/0001661 | A1 | 1/2009 | Klein et al. | 271/258.01 |
| 2009/0022390 | A1 | 1/2009 | Yacoubian et al. | 382/135 |
| 2009/0087076 | A1 | 4/2009 | Jenrick | 382/135 |
| 2009/0090779 | A1 | 4/2009 | Freeman | 235/450 |
| 2009/0310188 | A1 | 12/2009 | Jones et al. | 358/448 |
| 2009/0313159 | A1 | 12/2009 | Jones et al. | 705/35 |
| 2010/0034454 | A1 | 2/2010 | Jones et al. | 382/137 |
| 2010/0051687 | A1 | 3/2010 | Jones et al. | 235/379 |
| 2010/0057617 | A1 | 3/2010 | Jones et al. | 705/44 |
| 2010/0063916 | A1 | 3/2010 | Jones et al. | 705/35 |
| 2010/0092065 | A1 | 4/2010 | Jones et al. | 382/135 |
| 2010/0108463 | A1 | 5/2010 | Renz et al. | 194/206 |
| 2010/0116619 | A1 | 5/2010 | Jones | 194/217 |
| 2010/0163366 | A1 | 7/2010 | Jenrick et al. | 194/206 |

FOREIGN PATENT DOCUMENTS

| | | | | |
|---|---|---|---|---|
| EP | 0342062 | A2 | 11/1989 | |
| GB | 2 464 826 | A | 5/2010 | G07D 11/00 |
| WO | WO 91/11778 | A1 | 8/1991 | G06K 9/00 |
| WO | WO 92/17394 | A1 | 10/1992 | B65H 3/06 |
| WO | WO 93/23824 | A1 | 11/1993 | G06K 9/00 |
| WO | WO 95/24691 | A1 | 9/1995 | G06K 9/00 |
| WO | WO 96/10800 | A1 | 4/1996 | G06K 9/00 |
| WO | WO 96/36933 | A1 | 11/1996 | G06K 9/00 |
| WO | WO 97/30422 | A1 | 8/1997 | G07D 7/00 |
| WO | WO 97/43734 | A1 | 11/1997 | G06K 9/00 |
| WO | WO 97/45810 | A1 | 12/1997 | G07D 7/00 |
| WO | WO 98/12662 | A1 | 3/1998 | G06K 9/00 |
| WO | WO 98/13785 | A1 | 4/1998 | G06K 9/46 |
| WO | WO 98/24052 | A1 | 6/1998 | G06K 9/00 |
| WO | WO 98/24067 | A1 | 6/1998 | G07D 3/14 |
| WO | WO 98/35323 | A2 | 8/1998 | |
| WO | WO 98/40839 | A2 | 9/1998 | |
| WO | WO 98/47100 | A1 | 10/1998 | G06K 9/78 |
| WO | WO 98/50892 | A1 | 11/1998 | G07D 7/00 |
| WO | WO 99/09511 | A1 | 2/1999 | G06K 9/00 |
| WO | WO 99/14668 | A1 | 3/1999 | G06F 9/445 |
| WO | WO 99/23601 | A1 | 5/1999 | G06K 9/00 |
| WO | WO 99/41695 | A1 | 8/1999 | G06K 5/00 |
| WO | WO 99/48040 | A1 | 9/1999 | G06K 9/00 |
| WO | WO 99/48042 | A1 | 9/1999 | G06K 9/20 |
| WO | WO 00/24572 | A1 | 5/2000 | B31F 1/00 |
| WO | WO 00/65546 | A1 | 11/2000 | G07F 1/04 |
| WO | WO 01/08108 | A2 | 2/2001 | |
| WO | WO 01/59685 | A2 | 8/2001 | G06K 9/00 |
| WO | WO 01/59723 | A1 | 8/2001 | G07F 7/04 |
| WO | WO 02/29735 | A2 | 4/2002 | G07D 7/00 |
| WO | WO 02/054360 | A2 | 7/2002 | G07D 11/00 |
| WO | WO 03/005312 | A1 | 1/2003 | G07F 19/00 |
| WO | WO 03/028361 | A2 | 4/2003 | |
| WO | WO 03/029913 | A2 | 4/2003 | |
| WO | WO 03/030113 | A1 | 4/2003 | G07F 7/04 |
| WO | WO 03/067532 | A1 | 8/2003 | G07F 7/04 |
| WO | WO 03/107282 | A2 | 12/2003 | |
| WO | WO 2004/010367 | A1 | 1/2004 | G06K 5/00 |
| WO | WO 2004/027717 | A2 | 4/2004 | |
| WO | WO 2004/036508 | A2 | 4/2004 | G07D 7/12 |
| WO | WO 2004/038631 | A2 | 5/2004 | G06F 17/60 |

(56) References Cited

FOREIGN PATENT DOCUMENTS

| | | | | |
|---|---|---|---|---|
| WO | WO 2004/068422 | A1 | 8/2004 | G07D 11/00 |
| WO | WO 2005/013209 | A2 | 2/2005 | G07D 11/00 |
| WO | WO 2005/017842 | A1 | 2/2005 | G07D 11/00 |
| WO | WO 2005/028348 | A2 | 3/2005 | B65H 1/00 |
| WO | WO 2005/029240 | A2 | 3/2005 | |
| WO | WO 2005/036445 | A1 | 4/2005 | G06F 19/00 |
| WO | WO 2005/041134 | A2 | 5/2005 | |
| WO | WO 2005/076229 | A1 | 8/2005 | G07D 7/12 |
| WO | WO 2006/039439 | A2 | 4/2006 | G06K 9/00 |
| WO | WO 2006/076289 | A2 | 7/2006 | G07D 11/00 |
| WO | WO 2006/076634 | A2 | 7/2006 | G06Q 90/00 |
| WO | WO 2007/044570 | A2 | 4/2007 | G07D 11/00 |
| WO | WO 2007/120825 | A2 | 10/2007 | G06K 9/00 |
| WO | WO 2007/143128 | A2 | 12/2007 | B65H 29/12 |
| WO | WO 2008/030356 | A1 | 3/2008 | G06K 7/00 |
| WO | WO 2008/112132 | A1 | 9/2008 | G06K 9/00 |

* cited by examiner

CURRENCY DISCRIMINATION SYSTEM AND METHOD

RELATED APPLICATIONS

The present application claims priority from U.S. Provisional Patent Application Ser. No. 60/781,286, filed Mar. 9, 2006 and hereby incorporates the application by reference in its entirety.

FIELD OF THE INVENTION

The present invention relates, in general, to document identification. More specifically, the present invention relates to an apparatus and method for detecting magnetic attributes of currency bills.

BACKGROUND OF THE INVENTION

A variety of techniques and apparatus have been used to satisfy the requirements of automated currency handling systems. At the lower end of sophistication in this area of technology are systems capable of handling only a specific type of currency, such as a specific banknote (Euro or dollar) denomination, while rejecting all other currency types. At the upper end are complex systems which are capable of identifying and discriminating among and automatically counting multiple currency denominations.

Recent currency discriminating systems rely on comparisons between a scanned pattern obtained from a subject bill and sets of stored master patterns for the various denominations among which the system is designed to discriminate. There are a wide variety of bill sizes among different countries and even within the same currency system. Likewise, many other characteristics may vary between bills from different countries and of different denominations, such as, for example, the placement of a magnetic thread within the currency bills. The location of a magnetic thread within the currency bill and the information contained thereon can vary for different countries and different denominations as well as for different series of denominations.

Many types of currency bills possess magnetic attributes exhibiting magnetic properties which can be used to uniquely identify and/or authentic the currency bills. Examples of magnetic attributes include security threads exhibiting magnetic properties and ink exhibiting magnetic properties with winch portions of some bills are printed. Many of these magnetic attributes have a very small dimension(s). For example, many magnetic threads have a width on the scale of millimeters. These security threads may be formed from an intermittent-magnetic pattern, such that the segments of magnetic and nonmagnetic material may characterize a code. These segments generally have a fixed or variable length and may form a code, which may be repeated along the magnetic thread.

Typically, the presence of—and the information in—the magnetic code is determined using difficult and often complex algorithms to reconstruct code from the data obtained from numerous data channels. Standard magnetic-thread authentication and decoding techniques require time shifting the magnetic-code data to account for the velocity differences between the bills as they pass by the scan head. Such a technique is time consuming and requires additional electronic circuitry to perform the time-shift calculations.

SUMMARY OF THE INVENTION

According to one example, a document processing device for processing a plurality of documents having a magnetic feature is disclosed. The document processing device includes a magnetization member adapted to create a magnetic field of sufficient strength to magnetize a magnetic feature of each of a plurality of documents. A magnetic sensor has a continuous track width of greater than about 50 millimeters. The magnetic sensor is adapted to produce a linear, analog output signal in response to the plurality of magnetic features moving past the magnetic sensor. A transport mechanism is adapted to move the plurality of documents past the magnetization member and the magnetic sensor. The transport mechanism includes an encoder adapted to provide positional data. A comparator is adapted to detect when the analog output of the magnetic sensor exceeds a threshold value. A digital circuit is adapted to record the positional data provided by the encoder. The digital circuit records the positional data in response to the analog output signal of the magnetic sensor exceeding the threshold value.

Another example is a method for processing a plurality of documents having at least one magnetic feature. The method includes the acts of magnetizing the at least one magnetic feature. A flux of each of the plurality of documents is sensed by a magnetic sensor. An analog signal along a single channel is generated by the magnetic sensor as the plurality of documents are in close proximity to the magnetic sensor. The analog signal is representative of the sensed flux. The generated analog signal along the single channel is monitored with at least one comparator to determine whether a threshold voltage has been exceeded. The analog signal is digitized by generating an output voltage in response to the threshold voltage being exceeded. The output voltage is independent of the analog signal and is digitized without the use of an analog-to-digital converter.

According to some examples, positional information for a magnetic feature on a document is determined by sensing the presence of a magnetic feature and tracking the number of counts from an encoder.

According to some examples, an integrated scan head is disclosed having a magnetic sensor, a threshold detector, and a digital circuit. In some embodiments, the integrated scan head is adapted to be incorporated into a document processing device.

The above summary is not intended to represent each embodiment, or every aspect, of the present invention. Additional features and benefits of the present invention are apparent from the detailed description, figures, and appended claims set forth below.

Figure 1A:
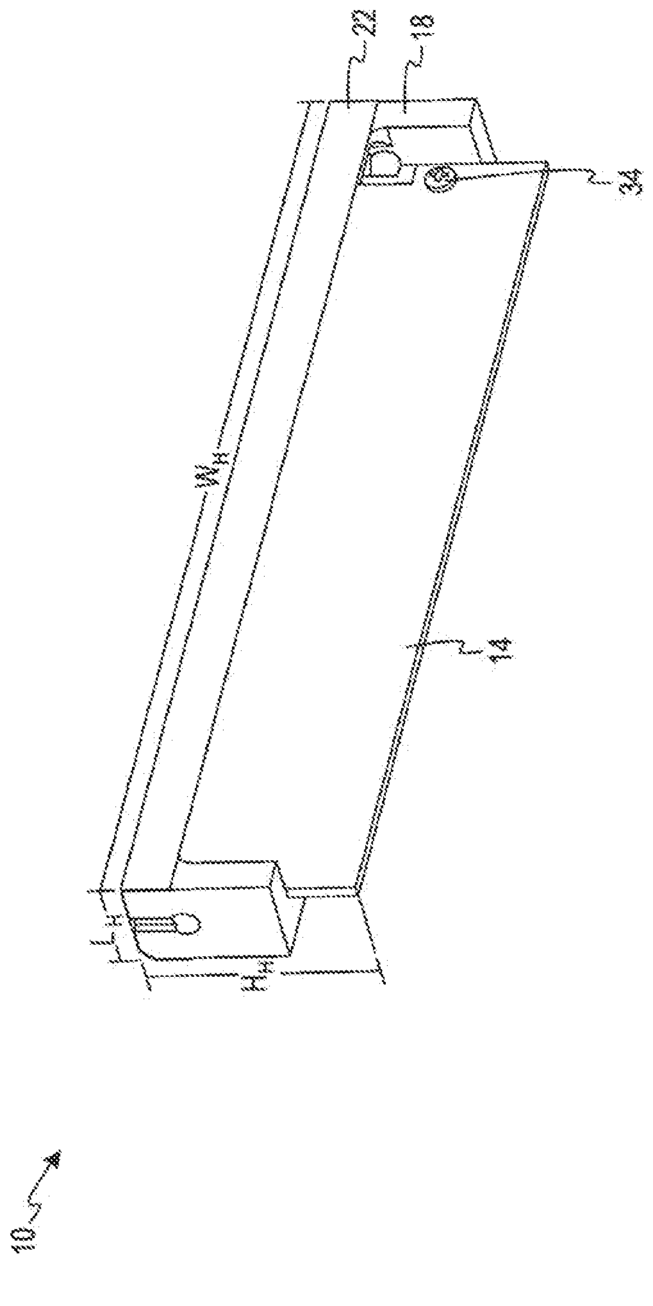
FIG. 1*a* is a perspective view of an integrated scan head, according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents and alternatives falling within the spirit and scope of the invention.

DESCRIPTION OF ILLUSTRATED EMBODIMENTS

Some embodiments of the present invention are directed to currency processing devices and methods for determining the denomination, authenticity, or other characteristic of a document by magnetically sensing a magnetic thread or other magnetic feature of the document. For example, a document may have a magnetic thread which is an intermittent-magnetic thread or other type of magnetic thread. The intermittent-magnetic thread may include magnetic and nonmagnetic segments that characterize a security code for the document. Alternatively, the magnetic thread may include magnetized portions having different thicknesses, different materials having different magnetic properties, or other means to characterize a code for the document. According to some embodiments, the magnetic thread is magnetically sensed by a single, continuous, wide-coverage, thin-film magnetic sensor. The currency processing device is adapted to determine the lengths or position of the differentiated segments (e.g., magnetic and nonmagnetic, etc.) and compare the determined lengths or positions with master data to verify the denomination and/or authenticity of the document.

Figure 1B:
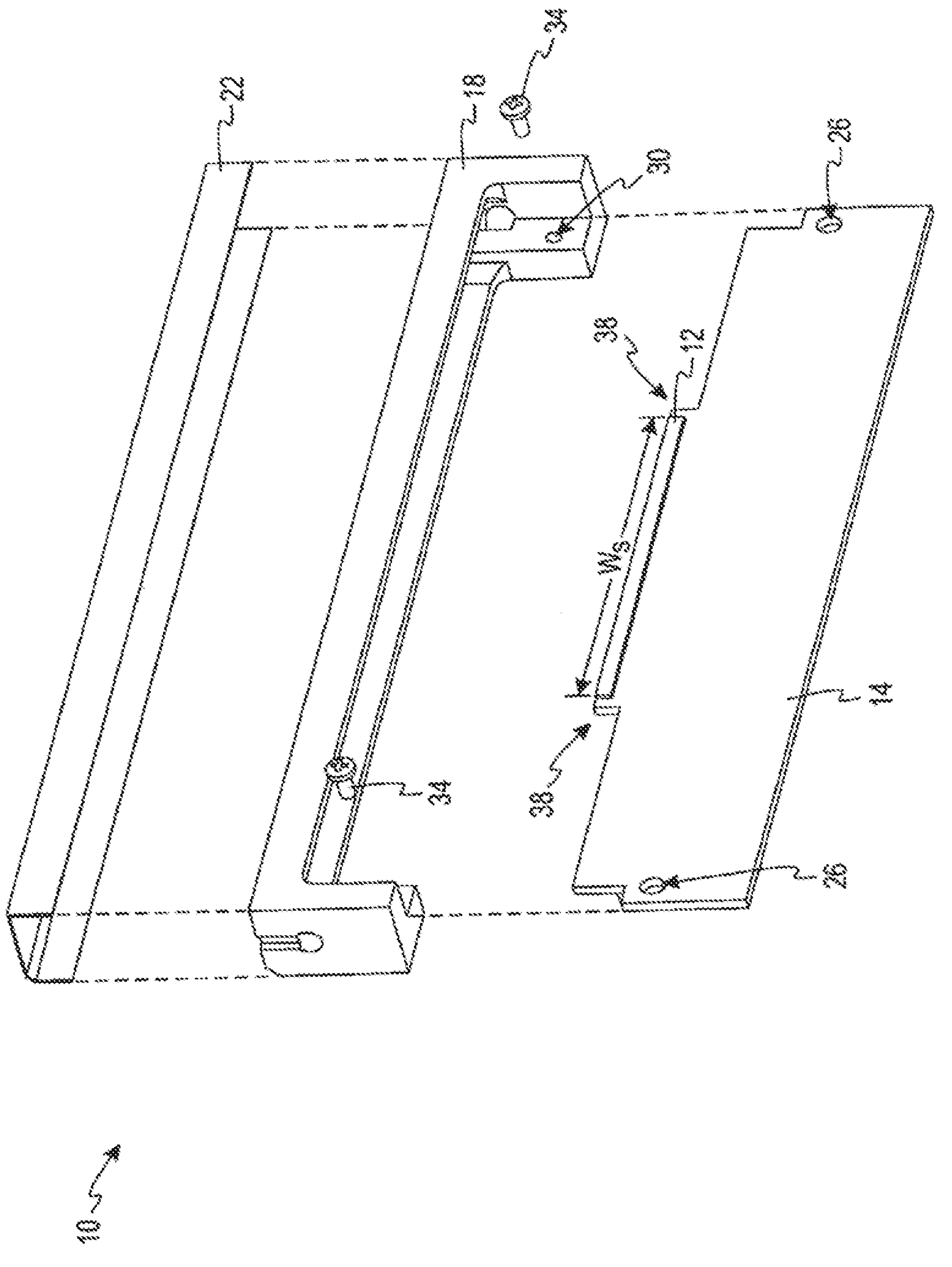
FIG. 1*b* is an exploded perspective view of the integrated scan head of FIG. 1*a*.

Referring now to the drawings, and initially to FIGS. 1*a-b*, an integrated magnetic scan head 10 according to one embodiment of the present invention is illustrated. The integrated scan head 10 comprises a magnetic sensor 12 attached to a PC board 14, a sensor housing 18, and a sensor cover 22. The PC board 14 and the sensor housing 18 include one or more holes 26 and 30, respectively, adapted to receive a fastening device 34, such as a screw. Alternatively or additionally, other fastening mechanisms may be utilized to attach the PC board 14 to the sensor housing 18. An adhesive or other fastening mechanism may be used to attach the sensor cover 22 to the sensor housing 18. According to some embodiments, the sensor housing 18 includes a slot (not shown) that allows the magnetic sensor 12 to be put in close enough proximity to a thread to sense a flux caused by moving a magnetic feature such as an intermittent-magnetic thread 84 (FIG. 2) past the magnetic sensor 12, as will be explained in greater detail with respect to FIG. 5.

According to some embodiments, the magnetic sensor 12 is a single, continuous, wide-coverage, thin-film magnetic sensor. According to some embodiments of the present invention, the magnetic sensor 12 consists of a nonmagnetic substrate (about 0.5 mm thick) having a smooth, flat surface and a thin-film sensing element deposited thereon. The nonmagnetic substrate may be, for example, formed from silicon, alumina, silicon carbide, alumina-titanium, carbide composite, Gadolinium Gallium Garnet (GGG), etc.

According to one embodiment, the magnetic sensor 12 is a magneto-resistive field sensor comprised of an active magnetic film (e.g., Permalloy, etc.) and associated current contacts to the PC board 14. In some embodiments, a magneto-resistive remanence field sensor is utilized for design simplicity. In alternative embodiments, the magnetic sensor 12 is an in-field sensor that reads the signal while applying a magnetic field. According to some embodiments, the magnetic sensor 12 is implemented in either a single element, a half-bridge configuration, or a full-bridge configuration, in alternative embodiments. The full-bridge configuration of the magnetic sensor 12 assists in providing enhanced linearity, increases the output signal, and minimizes common-mode magnetic field noise in a single electronic channel.

Figure 2:
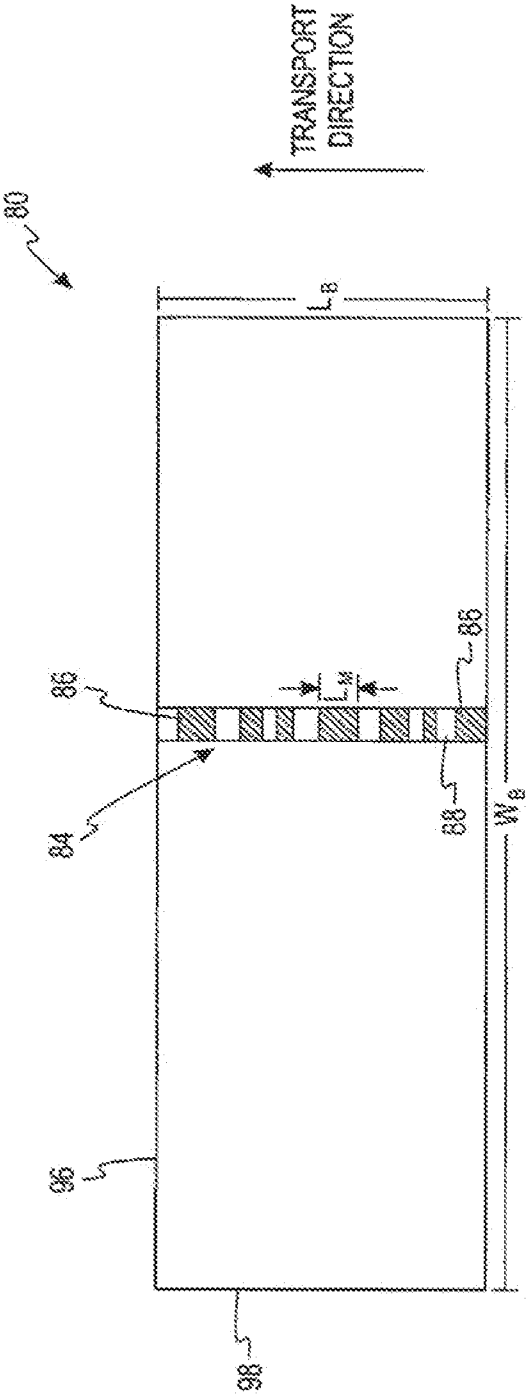
FIG. 2 illustrates a banknote including an intermittent-magnetic thread having magnetic and nonmagnetic segments, according to one embodiment of the present invention.

The magnetic sensor 12 includes stabilization means 38 adapted to eliminate Barkhausen instability. The stabilization means 38 assists in ensuring a linear response to excitation fields produced by an intermittent-magnetic thread 84 (FIG. 2). The stabilization means 38, in some embodiments, assists the magnetic sensor 12 in providing an essentially linear response (e.g., from about +15 Oe to about −15 Oe) to an applied magnetic field, such as the fields generated by a magnetized feature within a currency bill or other secure document. The stabilization means 38 is desirable due to the large size of the magnetic sensor 12—especially when considering the small size of the intermittent-magnetic thread 84 (FIG. 2) in relation to the overall size of the magnetic sensor 12. Various types of stabilization means 38 are well-known within the art and include, for example, anti-ferromagnetic layers, barber poles, current biasing, deposited magnets, exchange-coupled layers, external magnets, asymmetric placement in pole structure, a soft adjacent layer, etc.

According to one embodiment, the track width ($W_s$) of the magnetic sensor 12 is at least about 2.5 inches (about 60 mm) wide. In some embodiments of the present invention, the track width of the magnetic sensor 12 is at least about 2 inches (about 50 mm) wide. Due to the large track width of the magnetic sensor 12, the magnetic sensor 12 is adapted to sense the intermittent-magnetic thread 84 (FIG. 2) within a plurality of currency bills 80 (FIG. 2) that may vary in size and location in relation to the magnetic sensor 12. In some embodiments, the track width of the magnetic sensor 12 is at least about 0.8 inches (about 20 mm) wide. According to some embodiments, the track width of the magnetic sensor 12 is between about 0.8 inches (about 20 mm) and about 3 inches (about 80 mm). It should be noted that size of the magnetic sensor 12 is only limited by the largest wafer size available to form the substrate for the magnetic sensor 12.

The PC board 14 is in communication with the magnetic sensor 12 and is adapted to receive and interpret the data received from the magnetic sensor 12. The PC board 14 includes circuitry adapted to receive a signal from the magnetic sensor 12 that is indicative of the magnetic flux of a magnetic feature such as an intermittent-magnetic thread of a currency bill 80 (FIG. 2). The PC board 14, in some embodiments, includes an amplifier, low-pass filter (e.g., an amplifier circuit 652 illustrated in FIG. 6) to filter out noise from, and increase the amplitude of, the received signal. According to some embodiments, the PC board 14 further includes one or more threshold detectors to determine when the received signal is in excess of a predetermined threshold value and a digital circuit for analyzing and manipulating the received signal.

The circuit formed on the PC board, in some embodiments, is analog from the sensor to one or more comparators located on the PC board 14. According to some embodiments, the PC board 14 does not include an analog-to-digital, converter (ADC) to process the analog signal. In some such embodiments, the digitization is done via level threshold detection. Such designs assist in reducing the cost and complexity associated with ADCs.

Figure 6A:
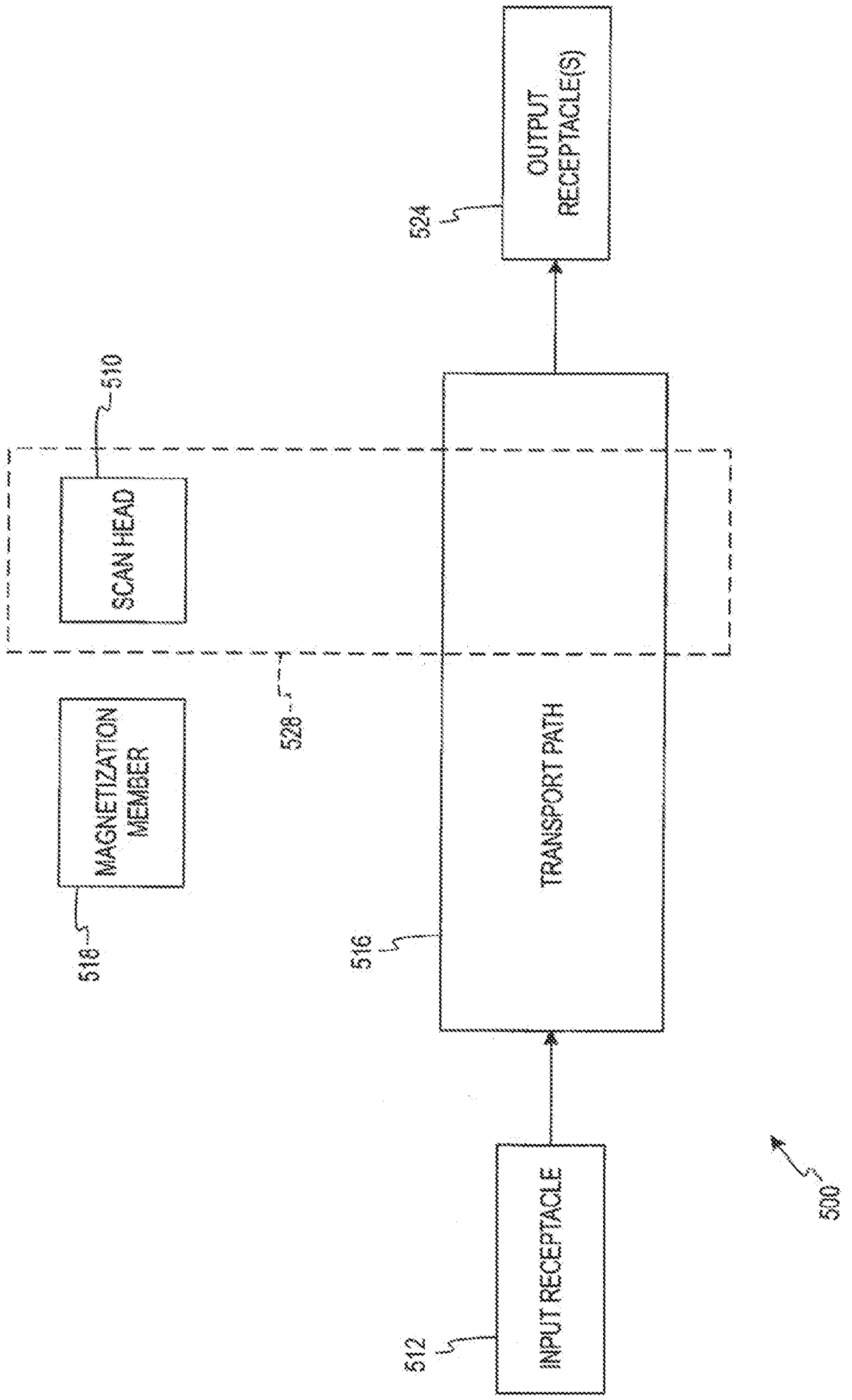
FIG. 6*a* is a functional block diagram of a currency processing device, according to one embodiment of the present invention.

As will be described below with respect to FIGS. 6-7, according to some embodiments, the PC board 14 is adapted to analyze the received signal from the magnetic sensor 12 and determine the denomination of a passing currency bill 80 (FIG. 2).

The PC board 14 is a printed circuit board and, in some embodiments, is an epoxy resin bonded glass fabric (ER-BGF), such as FR-4 (Flame Resistant 4). In other embodiments, any suitable non-conductive material adapted for allowing an etched copper sheet to be laminated onto the substrate can be used.

The housing 18 is adapted to protect the magnetic sensor 12 and surrounds a portion of the magnetic sensor 12 and the PC board 14. The housing 18 allows the integrated scan head 10 to be mounted within a currency processing device (e.g., currency processing devices 100, 200). According to some embodiments, the housing 18 is composed of aluminum or plastic. The cover 22 is adapted to prevent the magnetic sensor 12 from being inadvertently contacted during operation and, in some embodiments, is composed of a nonmagnetic stainless steel or any suitable, thin, hard, wear-resistant material.

According to one embodiment of the present invention, the fully assembled, integrated scan head 10—including the magnetic sensor 12, the PC board 14, the sensor housing 18, and the sensor cover 22—has a height ($H_h$) of about 1.1-1.2 inches (about 2.3-3.0 cm), a width ($W_h$) of about 6.4-6.6 inches (about 16.2-16.8 cm), and a length ($L_h$) of about 0.5-0.6 inches (about 1.2-1.5 cm). The height ($H_h$) is generally perpendicular to the plane of a passing currency bill 80 (FIG. 2). According to other embodiments, the integrated scan head 10 has a height of about 1-2 inches (about 2.5-5 cm), a width of about 6-7 inches (about 15-18 cm), and a length of about 0.3-1 inches (about 0.7-2.54 cm). It should be noted, however, that according to some embodiments, the scan head 10 may take on a variety of sizes and shapes, so long as the scan head 10 is of a proper size to be incorporated into a currency processing device.

Turning now to FIG. 2, a currency bill 80 is illustrated by way of example. The currency bill 80 includes an intermittent-magnetic thread 84 that includes magnetic segments 86 and nonmagnetic segments 88. The magnetic and nonmagnetic segments 86, 88 may be of various lengths, sizes, and shapes along the intermittent-magnetic thread 84. The intermittent-magnetic thread 84 may characterize a code for the particular currency bill 80. By varying, for example, the lengths of the magnetic and nonmagnetic segments 86, 88, the characterized code can be changed for different documents, such as to differentiate denominations for a particular currency system. Alternatively, the currency bill 80 may include additional or alternative magnetic features adapted to characterize and/or secure the currency bill 80 or another document.

The currency bill 80 may be generally rectangular in shape and include a wide edge 96 and a narrow edge 98. The currency bill 80 has a length ($L_b$) and a width ($W_b$). Typically, the intermittent-magnetic thread 84 runs generally parallel to the narrow edge 98 of the currency bill 80. However, in alternative documents and currency bills, the intermittent-magnetic thread 84 may ran generally parallel to the wide edge 96 of the currency bill. In still other embodiments, the intermittent-magnetic thread 84 may run serpentine or generally diagonally through the currency bill. Each of the magnetic and nonmagnetic portions 86, 88 of the intermittent-magnetic thread 84 has an associated length ($L_m$)

Figure 3:
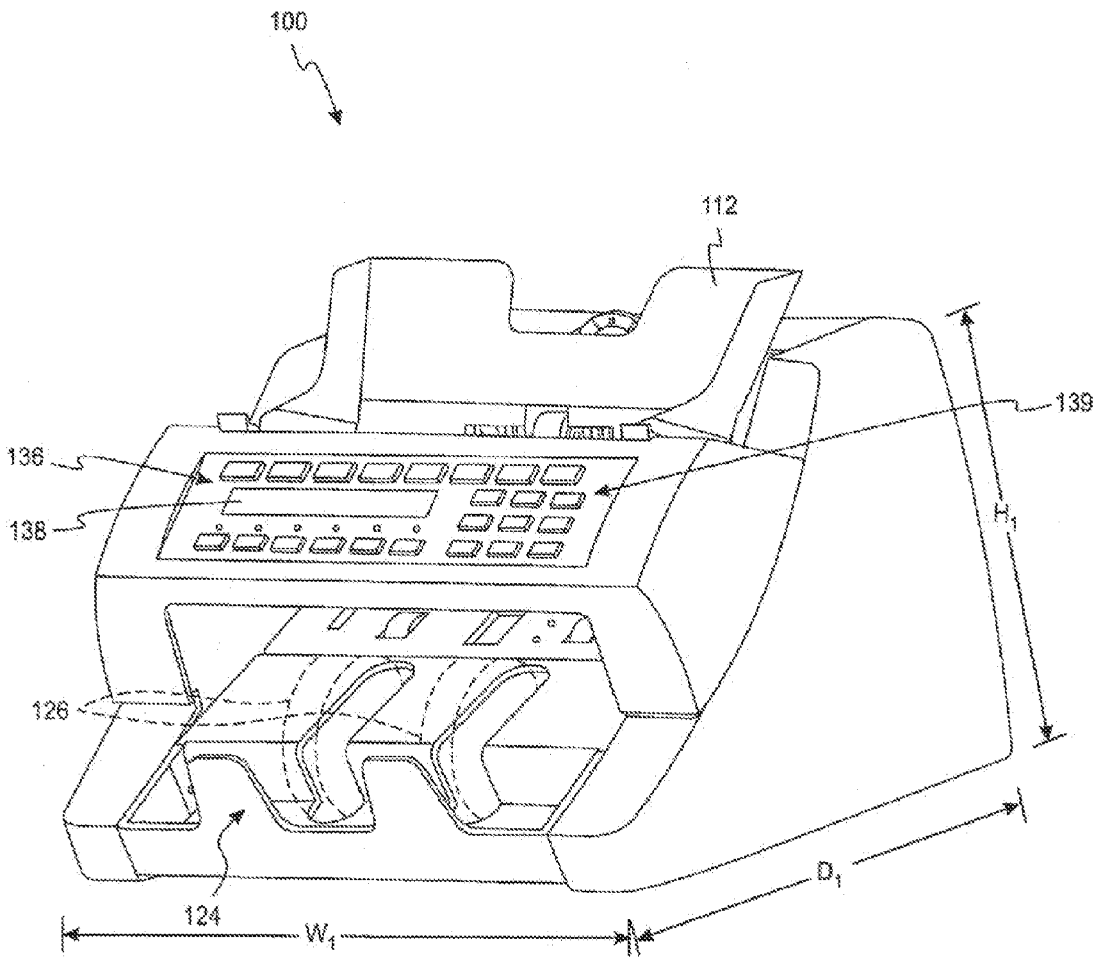
FIG. 3 is a perspective view of a single-pocket currency processing device incorporating the scan head of FIG. 1, according to one embodiment of the present invention.

Referring to FIG. 3, there is shown a currency processing device 100 having a single output receptacle that may incorporate the integrated scan head 10 of FIG. 1. The device 100 includes an input receptacle 112 for receiving a stack of currency bills to be processed. The currency bills in the input receptacle 112 are picked out or separated, one bill at a time, and sequentially relayed by a bill transport mechanism 310 (FIG. 5) past the magnetic sensor 10. Scanned bills are then transported to an output receptacle 124, which may include a pair of stacking wheels 126, where processed bills are stacked for subsequent removal. The processed bills transported and stacked in the output receptacle 124 may include bills of a single denomination or multiple denominations, depending on the stack of bills received by the input receptacle 112 and the mode of operation of the device 100. The output receptacle 124 may include all or less than all of the bills that have been verified or processed by the currency processing device 100.

According to some embodiments, all of the processed bills that have been denominated are transported to one, and only one, output pocket. According to other embodiments, all of the processed bills that have been authenticated are transported to one, and only one, output pocket. According to still other embodiments, all of the processed bills that have been denominated and authenticated are transported to one, and only one, output pocket. According to yet another embodiment, all of the processed bills that have been processed are transported to one, and only one, output pocket.

The single-pocket device 100 includes an operator interface 136 with a display 138 for communicating information to an operator of the device 100, and buttons 139 for receiving operator input. In alternative embodiments, the operator interface 136 may comprise a touch-screen-type interface or other interface. Additional details of the operational and mechanical aspects of single-pocket devices 100 are described in U.S. Pat. Nos. 5,295,196 and 5,815,392, each of which is incorporated herein by reference in its entirety.

According to some embodiments, the single-pocket device 100 is compact and designed to be rested on a tabletop. The device 100 of FIG. 3, in one embodiment, has a height ($H_1$) of about 9.5 inches (about 24 cm), a width ($W_1$) of about 11-15 inches (about 28-38 cm), and a depth ($D_1$) of about 12-16 inches (about 30-40 cm), which corresponds to a footprint ranging from about 130 $in^2$ (about 850 $cm^2$) to about 250 $in^2$ (about 1600 $cm^2$) and a volume ranging from about 1200 $in^3$ (about 20,000 $cm^3$) to about 2300 $in^3$ (about 38,000 $cm^3$).

Figure 4:
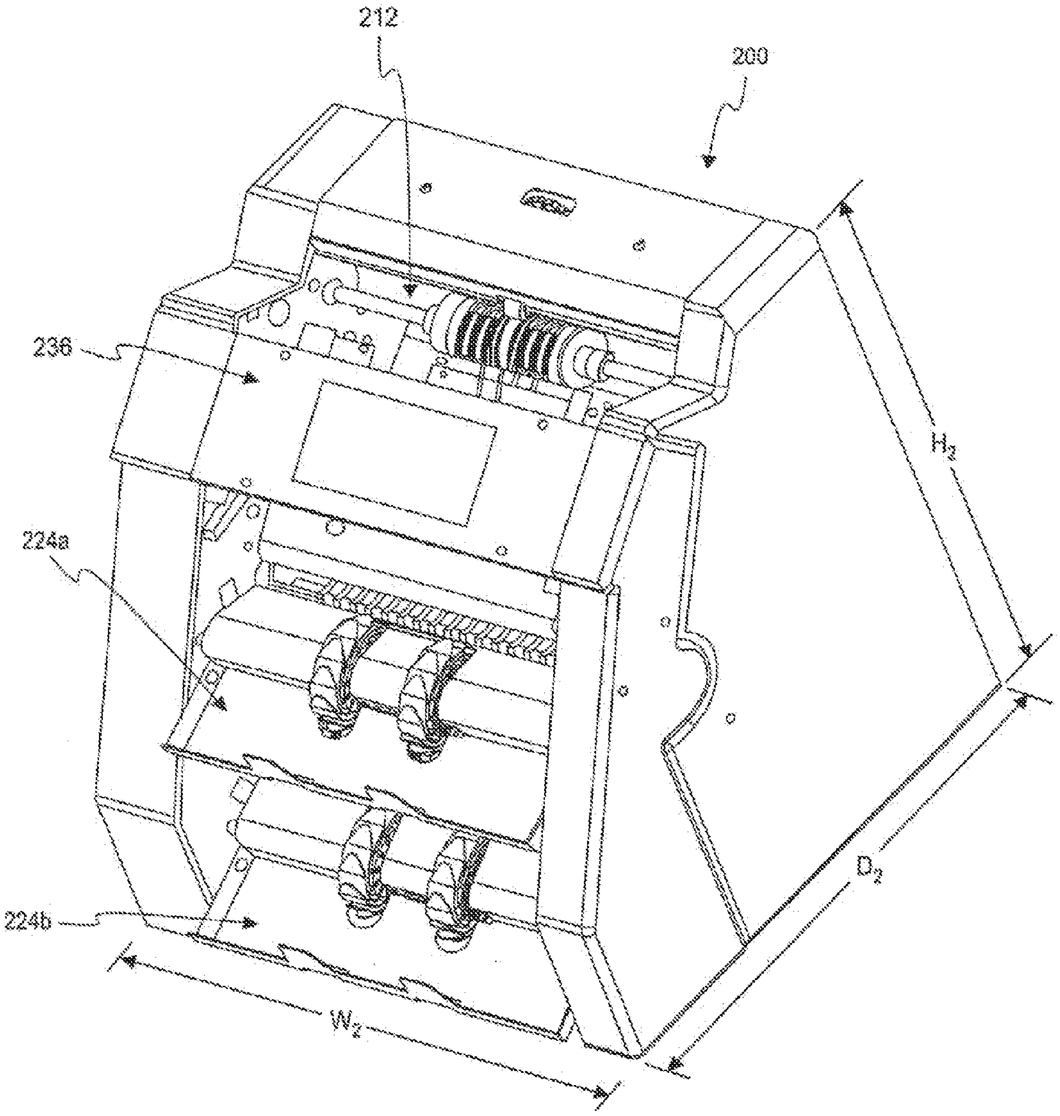
FIG. 4 is a perspective view of a two-pocket currency processing device incorporating the scan head of FIG. 1, according to another embodiment of the present invention.

Referring now to FIG. 4, the integrated scan head 10 of FIG. 1 may be incorporated into a currency processing device having more than one output receptacle in alternative embodiments of the present invention. For example, a currency processing device 200 having two output receptacles (e.g., a two-pocket device)—a first output receptacle **224*a* and a second output receptacle 224*b*—may incorporate the integrated scan head 10 (FIG. 1) in accordance with the present invention. Generally, the two-pocket device 200 operates in a similar manner to that of the single-pocket device 100 (FIG. 3), except that the transport mechanism (not shown) of the two-pocket device 200 transports the bills from an input receptacle 212 past the integrated scan head 10 (FIG. 1) to either or both of the two output receptacles 224***a*, 224*b*.

The two output receptacles 224*a,b* may be utilized in a variety of fashions according in various applications. For example, in the processing of currency bills, the bills may be directed to the first output-receptacle 224*a* until a predetermined number of bills have been transported to the first output receptacle 224*a* (e.g., until the first output receptacle 224*a* reaches capacity or a strap limit) and then subsequent bills may be directed to the second output receptacle 224*b*. In another application, all bills are transported to the first output receptacle 224*a* except those bills triggering nonconforming error signals such as, for example, "no call" and "suspect document" error signals, which are transported to the second output receptacle 224*b*. The two-pocket device 200 includes operator interface 236 for communicating with an operator of the two-pocket device 200. Further details of the operational and mechanical aspects of the two-pocket device 200 are detailed in U.S. Pat. Nos. 5,966,546; 6,278,795; and 6,311, 819; each of which is incorporated herein by reference in its entirety.

The two-pocket device 200 is compact, and according to one embodiment, has a height ($H_2$) of about 17.5 inches (about 44 cm), a width ($W_2$) of about 13.5 inches (about 34 cm), and a depth ($D_2$) of about 15 inches (about 38 cm), and weighs approximately 35 lbs. (about 16 kg). The two-pocket device 200 is compact and is designed to be rested upon a tabletop. The two-pocket device 200, according to one embodiment, has a footprint of less than about 200 $in^2$ (about 1300 $cm^2$) and occupies a volume of less than, about 3500 $in^3$ (about 58,000 $cm^3$).

In yet other alternative embodiments of the present invention, the integrated scan head 10 of FIG. 1 may be implemented in a currency processing device having more than one output receptacle or more man two-output receptacles. Examples of currency processing devices having three, four, five, and six output receptacles are described in U.S. Pat. Nos. 6,398,000 and 5,966,456, each of which is incorporated herein in its entirety; as well as in U.S. patent application Ser. No. 10/903,743 filed Jul. 30, 2004, entitled "Apparatus and Method for Processing Documents Such as Currency Bills", which is incorporated herein by reference in its entirety.

According to various alternative embodiments, the currency processing devices (such as devices 100, 200) incorporating the magnetic scan head 10 are capable of processing currency at a rate from about 600 to over 1500 bills per minute. According to some embodiments, the currency processing devices (such as devices 100, 200) incorporating the magnetic scan head 10 are capable of processing currency at a rate of in excess of about 800 bills per minute. According to some embodiments, the currency processing devices (such as devices 100, 200) incorporating the magnetic scan head 10 are capable of processing currency at a rate of in excess of about 1000 bills per minute. According to some embodiments, the currency processing devices (such as devices 100, 200) incorporating the magnetic scan head 10 are capable of processing currency at a rate of in excess of about 1200 bills per minute. According to some embodiments, the currency processing devices (such as devices 100, 200) incorporating the magnetic scan head 10 are capable of processing currency at a rate of in excess of about 1500 bills per minute.

Figure 5:
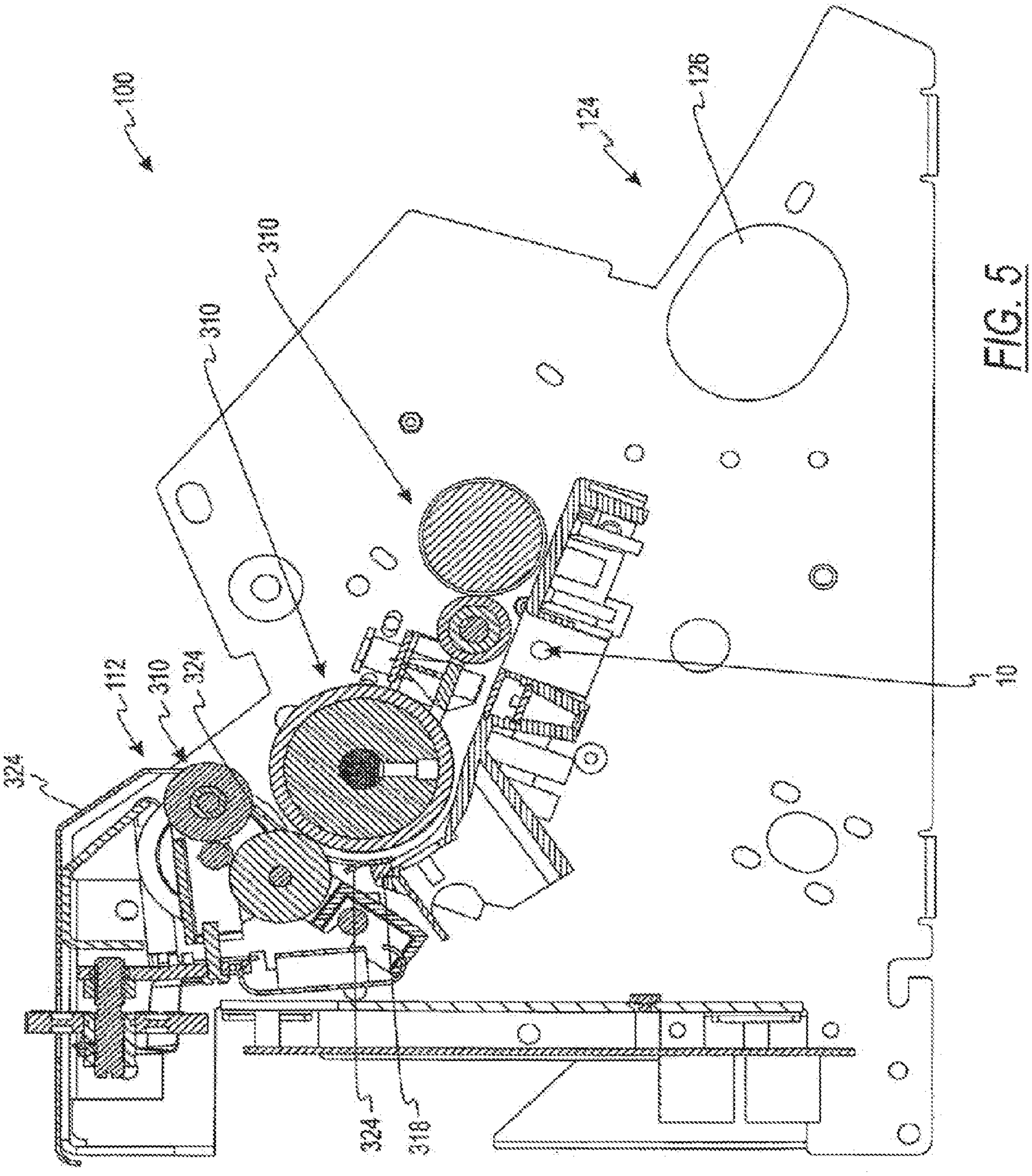
FIG. 5 is a side view of the internal compartment of the single-pocket currency processing device of FIG. 3 incorporating the scan head of FIG. 1, according to one embodiment of the present invention.

Turning now to FIG. 5, a transport mechanism and internal components of a currency processing device, such as the currency processing device 100 (FIG. 3), are illustrated in FIG. 5, according to one embodiment of the present invention. A plurality of currency bills, such as currency bill 80 (FIG. 2), is placed into the input receptacle 112 of the currency processing device 100. The plurality of currency bills are individually withdrawn from the input receptacle 112 and a transport mechanism 310 moves the plurality of currency bills through the currency processing device 100. The transport mechanism 310 guides the currency bills to one or more output receptacles 124. It should be noted that the detailed construction of the transport mechanism 310 to convey documents through the currency processing device 100 is not required to understand the present invention. Many configurations of various transport mechanisms are known in the art. An exemplary configuration includes an arrangement of pulleys and rubber belts driven by a single motor.

Before reaching the output receptacle 124, the transport mechanism 310 guides the currency bills past an evaluation region (not shown), which comprises one or more sensors (e.g., integrated scan head 10), where a currency bill can be, for example, analyzed, authenticated, denominated, counted, and/or otherwise processed. The results of the above process or processes are communicated to a user of the currency processing device 100 via the operator interface 136 (FIG. 3). The results of the above process or processes may be used to control the operation of the currency processing device 100 (e.g., whether to suspend operation of the device when a nonconforming bill is detected).

A magnetization member 318 is located proximate a transport path defined by the transport mechanism 310. In the illustrated embodiment, a guide 324 is positioned between the magnetization member 318 and the transport mechanism 310 to assist in transporting the currency bills along the transport path near the magnetization member. According to some embodiments, the guide may be made from any nonmagnetic material (at least in the area proximate the magnetization member 318), such as aluminum. According to some embodiments, the magnetization member 318 should produce a constant magnetic field with a strength at the surface of the currency bill 80 that is larger than the field required to substantially saturate—or maximize the magnetization of—the magnetic material of the intermittent-magnetic thread 84 (FIG. 2). Generally, a saturation field strength of at least three times larger than the coercivity of the bill's magnetic material ensures that the note becomes saturated, though this field strength may be reduced or increased if desired. It has been determined that the coercivity for a five-Euro note, for example, is approximately 300 Oe. Therefore, in currency processing devices 100 adapted to process a five-Euro note, according to one embodiment, a saturation field of approximately 1000 Oe is sufficiently strong to magnetise the currency bill.

In other embodiments of the present invention, the magnetization member 318 produces a constant magnetic field that is less than the field required to substantially saturate the magnetic material in the thread. The produced magnetic field is sufficient to magnetize the material of the thread so the magnetic material produces a magnetic field of a strength and polarity sufficient for a magnetic scanhead to defect the magnetic material. Where the magnetic material is included within an interment-magnetic thread 84 that includes denomination data encoded thereon, the magnetic field and polarity is sufficient to allow the scan head 10' to decode and denominate the currency bill 80.

In still other embodiments, the magnetization member 318 produces an alternating (variable) magnetic field of a defined frequency with a strength at the surface of the currency bill that is larger then the field required to substantially saturate the magnetic material of the intermittent-magnetic thread 84 (FIG. 2).

In yet other embodiments, the magnetization member 318 produces an alternating magnetic field that is less than the one required to substantially saturate the magnetic material. The alternating magnetic field is sufficient to magnetise the magnetic material so the magnetic materials produces a magnetic field of a strength and polarity sufficient for the magnetic scan head 10 to detect the magnetic material. Where the magnetic material is included within an interment-magnetic thread 84 that includes denomination data encoded thereon, the magnetic field and polarity is sufficient to allow the scan head 10 to decode and denominate the currency bill 80. As a currency bill 80 containing the intermittent-magnetic thread 84 passes the magnetization member 318—producing the alternating magnetic field—a magnetic pattern is recorded/encoded into the magnetic material (as illustrated, according to one embodiment, in FIG. 9*b*). According to some embodiments, the recorded magnetic pattern is of variable distance, fixed frequency, or variable frequency.

For standard currencies, for example, the saturation field can range in strength from about 0 Oe to in excess of about 3000 Oe depending on the magnetic properties of the bill to be examined. A reverse field can range in strength from about 0 Oe to in excess of about 3000 Oe as well. The magnetization member 318 can be designed to cover all or part of this range. According to one embodiment, a magnetization member 318 is provided that creates a field from about 750 Oe to in excess of about 1500 Oe, and in some embodiments, a magnetization member 318 is provided that creates a field of about 1000 Oe. According to still other embodiments, the magnetization member 318 creates a field from about 3,000 Oe to about 5,000 Oe. According to yet other embodiments, the magnetization member 318 creates a field greater than about 5,000 Oe. According to some embodiments of the present invention, even greater field strengths may be utilized depending on the material to be magnetized.

The magnetization member 318 may be any suitable magnet sufficient to generate the desired magnetizating field. For example, the magnetization member 318 may be a permanent magnet constructed of any hard magnetic material, such as AlNiCo 5, 7 or 9, SmCo (samarium cobalt), NdFeB (Neodysnium Iron Boron), etc. Alternatively, the magnetization member 318 may be an electromagnetic device (or a combination of a permanent magnet and an electromagnetic device) that can be adjusted to generate the desired magnetizing field.

In another embodiment, the magnetization, member 318 may be a recording head when a variable magnetic field is desired. In yet another embodiment, where a variable magnetic field is desired, the magnetization, member 318 may be a roller recorder. U.S. Pat. Nos. 5,691,682 and 6,233,407, further discuss roller recorders and are incorporated herein by reference in their entirety. In one group of embodiments, the magnetic field produced by an electromagnetic device is a constant field, while in another group of embodiments, the magnetic field produced by the electromagnetic device is an alternating magnetic field.

According to one embodiment, the magnetization member 318 is a permanent magnet having a width of about 3.0 inches (about 75 mm), a length of about 0.18 inches (about 4.6 mm), a height of about 0.12 inches (about 3.2 mm), and a remanent magnetization (Mr) of about 1000 emu/cm$^3$. In this embodiment, the distance from the magnetization member 318 to the currency bill may vary from about 0.06 inches (1.5 mm) to about 0.14 inches (3.5 mm) with an average distance of 0.98 inches (2.5 mm). Further, it should be obvious to those skilled in the art that any magnet wider than, about 3.0 inches (about 75 mm) and other magnets having various widths, lengths, heights, and remanent magnetization can be used for the magnetization member 318.

According to other embodiments, the magnetization member 318 is an electromagnetic device having a magnetizing width of about 3.0 inches (about 75 mm) or wider. According to one embodiment, the distance between the electromagnetic magnetization member to the currency bill may vary from about 0.06 inches (1.5 mm) to about 0.14 inches (3.5 mm) with an average distance of 0.98 inches (2.5 mm).

According to some embodiments, the direction of the magnetic field produced by tire magnetization member 318 is parallel to the height (e.g., perpendicular to the plane of the document) of the magnetization member 318. According to some other embodiments, the direction of the magnetic field produced by the magnetization member 318 is parallel to the length of the magnetization member 318. It should be understood by those skilled in the art that magnetization members 318 of varying size, shape, strength, and producing different field strength and field direction can be utilized to satisfy the magnetizing needs of a particular document (or magnetic portion thereof), as described above.

The magnetization member 318 is located along the transport path upstream from the integrated scan head 10. In some embodiments, the separation distance between the magnetization member 318 and the integrated scan head 10 (where the integrated scan head 10 is a remanent, anisotropic, magneto-resistive field sensor) is selected to avoid interference in the integrated scan head 10 due to the magnetic field created by the magnetization member 318. In some of these embodiments, the magnetization member 318 is located at least about 1 inch (about 2.5 cm) upstream from the integrated scan head 10, and in certain embodiments, the magnetization member 318 is located at least about 2.4 inches (about 6 cm) upstream from the integrated scan head 10.

Referring now to FIG, 6*a*, a block diagram of a document processing device 500 is illustrated, according to some embodiments of the present invention. According to some embodiments, the document processing device 500 includes at least one input receptacle 512 adapted to receive one or more documents and at least one output receptacle 524 adapted to collect one or more of the documents processed by the document processing device 500. A transport path 516 connects the at least one input receptacle 512 and the at least one output receptacle 524. The documents received by the input receptacle are moved along the transport path 516 past a magnetization member 518 (such as the magnetization member 318 illustrated in FIG. 5) and an evaluation region 528 that includes one or more scan head 510. The one or more scanhead 510 may be, in some embodiments, the integrated scan bead 10, illustrated in FIGS. 1*a-b*. According to some embodiments of the present invention, the magnetization member 518 may be included within the evaluation region and, in still other embodiments, within the scan head 510 itself.

Figure 6B:
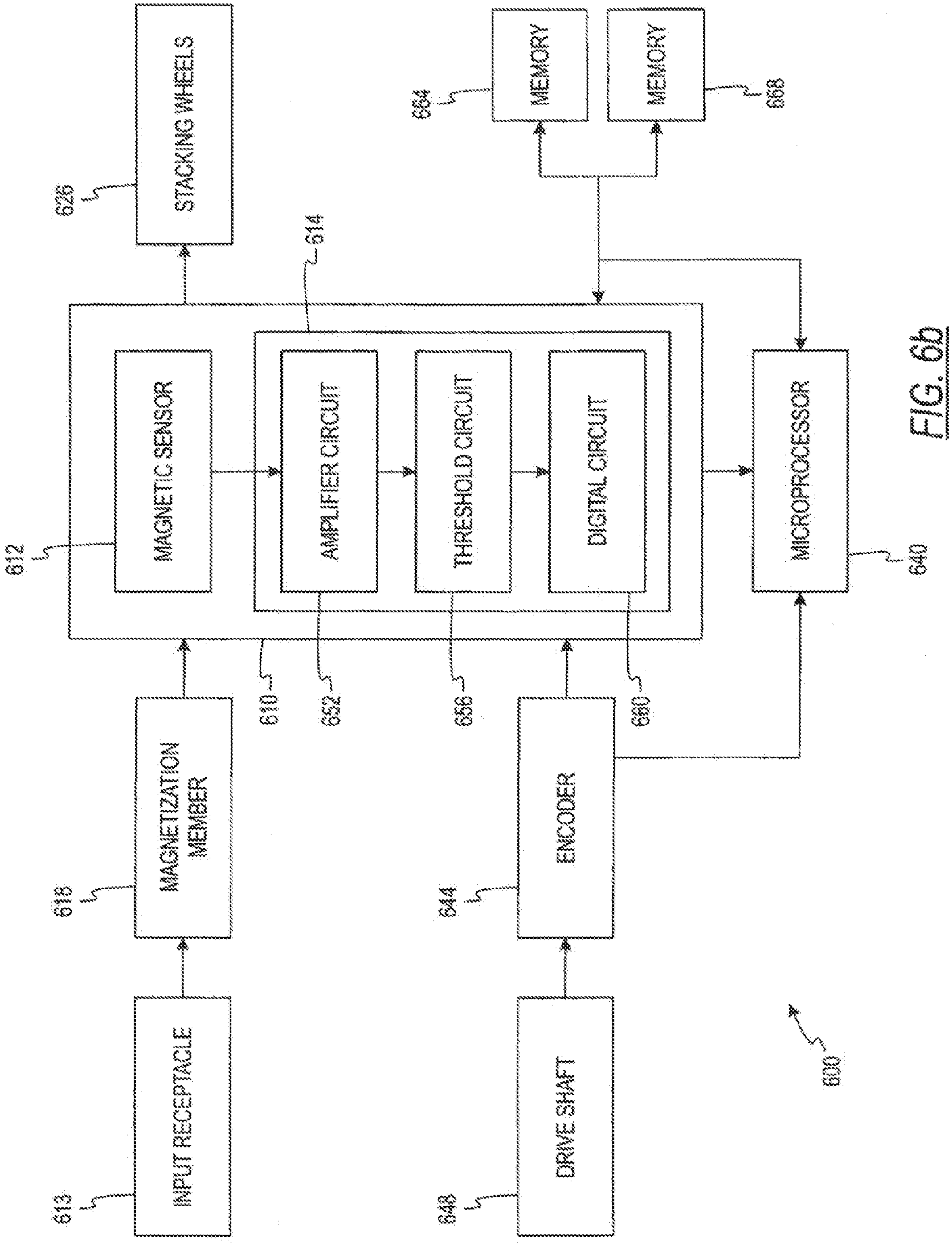
FIG. 6*b* is a functional block diagram of a currency processing device, according to another embodiment of the present invention.

Referring now to FIG. 6*b*, a block diagram of a currency processing device 600 is illustrated, according to one embodiment of the present invention. A microprocessor 640 controls the overall operation of the currency processing device 600. An encoder 644 provides input to the microprocessor 640 and/or the PC board 14 based on the position of a drive shaft 648, which forms past of a transport mechanism (such as, for example, the transport mechanism 310 illustrated in FIG. 5). The input from the encoder 644 allows the microprocessor 640 or a PC board 614 to calculate the position of a currency bill 80 (FIG. 2) as it travels and to determine the timing of the operations of the currency processing device 600.

A stack of currency (not shown) may be deposited into an input receptacle 613 that holds the currency and allows the bills in the stack to be conveyed one at a time through the currency processing device 600. After the bills are conveyed to the interior of the currency processing device 600, at least a portion of the bill passes the magnetization member 618 and is then magnetically scanned by the scan head 610. The scan head 610 may be an integrated scan head (such as, for example, the integrated scan head 10 of FIG. 1) or may include a plurality of individual components as described. According to some embodiments, a magnetic sensor 612 generates a signal that is processed through a single data channel that corresponds to the magnetic field generated by the passing currency bill 80. The data is sent from the magnetic sensor 612 of the scan head 610, via the single data channel, to an amplifier circuit 652 on a PC board 614. The output from the amplifier is sent to a threshold circuit 656 which may also be on the PC board 614. The threshold circuit 656, according to some embodiments, includes one or more comparators for determining when the amplified analog signal exceeds a predetermined threshold such as a predetermined threshold voltage. Once the threshold circuit 656 recognizes that the amplified signal exceeds a predetermined threshold voltage (indicative of a leading edge—or other portion—of a magnetic segment 86 of the intermittent-magnetic thread 84), a digital circuit 660 on the PC board 614 begins to measure the counts provided by the encoder 644, as will be further discussed with respect to FIG. 7.

Figures 9A, 9B, 9C, 9D, 9E:
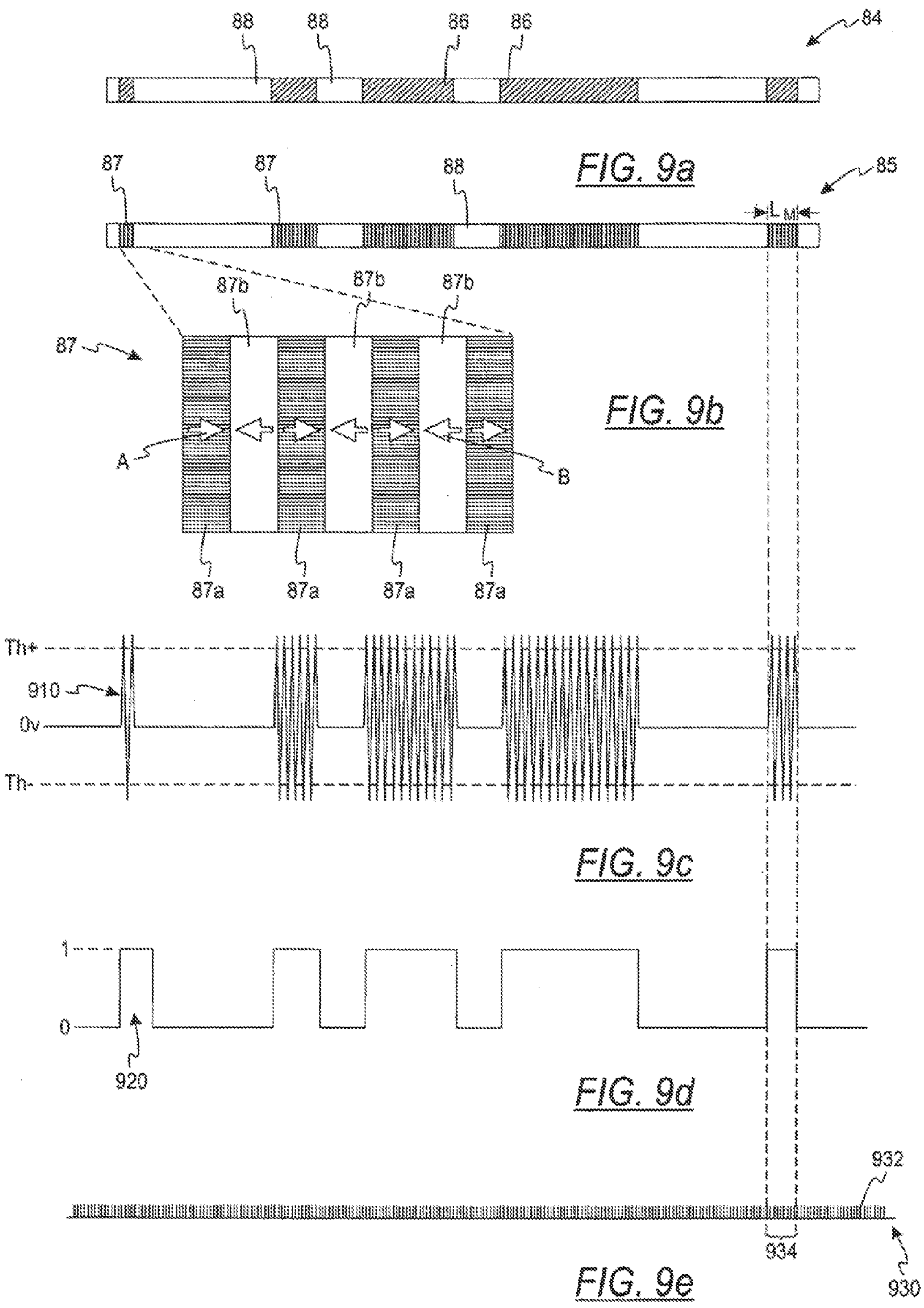
FIGS 9*a-e* illustrate a digitization method for an analog magnetic signal generated by a magnetic sensor sensing a magnetic element, according to another embodiment of the present invention.

Similar to FIG. 6*b*, in an alternative embodiment, as the bill is exposed to a magnetization member, the magnetization member produces an alternating magnetic field. A magnetic pattern is recorded/encoded onto/into the magnetic portion(s) 86 of the intermittent-magnetic thread 84 due to the alternating magnetic field produced by the magnetization member. As the bills are magnetically scanned, the magnetic sensor generates an analog signal that is processed through a single data channel. According to some embodiments, the analog signal corresponds to the magnetic field generated by the passing currency bill 80 containing the now magnetically-encoded, intermittent-magnetic thread 85 (FIG. 9*b*).

According to some embodiments, the analog signal from the magnetic sensor passes through an amplifier circuit, which may include a bandpass filter. The bandpass filter is tuned/optimized to recognize the frequency of the pattern encoded by the magnetization member into the magnetic portion(s) 86 of the intermittent-magnetic thread 84. The filtered analog signal is then sent to the threshold circuit, which includes a comparator. Generally, the output from the bandpass filter is essentially zero when a nonmagnetic portion 88 of the intermittent-magnetic thread 84 passes by the scan head (see, e.g., FIGS. 9*c-d*). Alternatively, the output from the bandpass filter is generally of a certain non-zero amplitude when the magnetic portion of the thread passes over the scan head 610.

According to some embodiments, the digital circuit 660 saves the count data to a memory 664, such as a random access memory ("RAM") or other memory device, forming a set of count data that corresponds to the object scanned. According to some embodiments, the digital circuit 660 determines the denomination of the currency bill 80 by comparing the count data for the various magnetic and nonmagnetic sections 86, 88 of the intermittent-magnetic thread 84 to stored master data stored for genuine currency bills. According to some embodiments, the stored master data is located in a look-up table.

According to some embodiments, the count data stored in the memory 664 is compared by the digital circuit 660 to master count data stored in a memory 668, such as a read only memory ("ROM"), a RAM, or other memory device. The stored master data corresponds to magnetic data generated from genuine currency of a plurality of denominations. The count data stored on the memory 663 may represent various orientations of genuine currency to account for the possibility of a bill in the stack being in a reversed orientation compared to other bills in the stack. The digital circuit 660 communicates the determined denomination for the currency bill 80 to the microprocessor 640.

If the count data generated by the bill being evaluated does not fall within an acceptable limit of any of the master data stored in the memory 668, the bill is determined to be of an unknown denomination or other nonconforming document by the digital circuit 660. The digital circuit 660 communicates this information to the microprocessor 640, which, in some embodiments, can stop the currency processing device 600 to allow removal of the nonconforming document from the stack, of currency or the currency processing device 600. Specifically, the microprocessor 640 can halt the operation of the currency processing device 600 (by utilizing the data provided by the encoder 644) such that when the currency processing device 600 is stopped, the unknown bill is the last bill transported to the output receptacle and/or is atop of the accumulated stack of currency bills in the output receptacle 624.

Furthermore, the currency processing device 600, and specifically the microprocessor 640 may desirably include the capability to maintain a running total of genuine currency of each denomination and/or an aggregate total for the stack of currency denominated.

Figure 7:
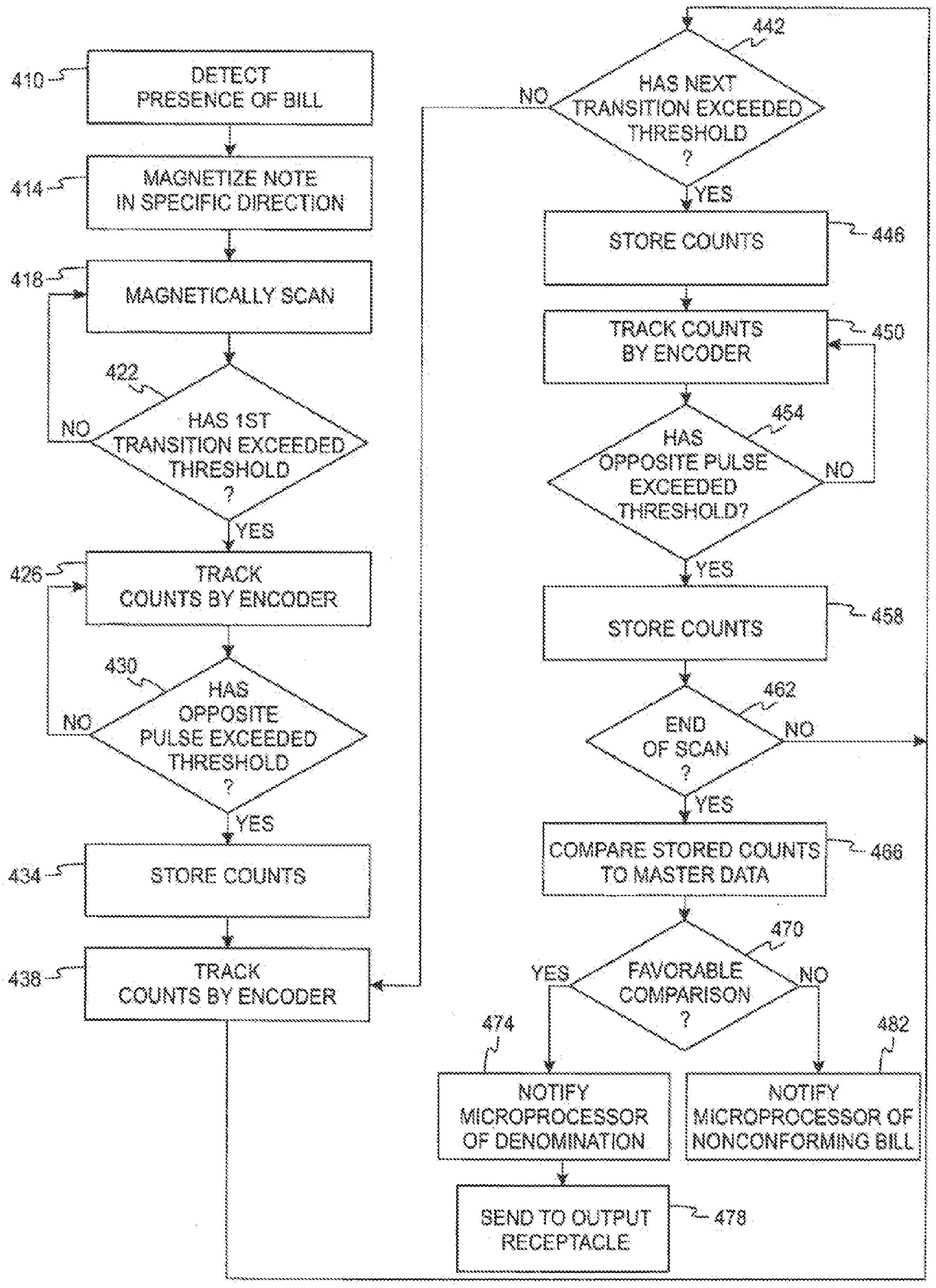
FIG. 7 is a flow chart describing the operation of a currency processing device, according to one embodiment of the present invention.

Turning now to FIG. 7, the operation of the currency processing device 600 will be further described, according to one embodiment of the present invention. At step 410, the presence of a bill in the input receptacle 613 is recognized and a magnetic scanning operation is initiated. The currency bill 80 is magnetized in a specific direction, at step 414, by the magnetization member 618. In alternative embodiments, where an in-field magnetic sensor is utilized, the magnetization member 618 may be included within the scan head 610 itself.

Once the currency bill 80, and more specifically, the intermittent-magnetic thread 84, has been sufficiently magnetized, a magnetic scan is performed, at step 418, by the magnetic sensor 612. The threshold circuit 656 monitors the analog output from the magnetic sensor 612, via the amplifier circuit 652, and a determination is made at decision box 422 whether a first transition has exceeded a predetermined threshold level such as a voltage level of fifty percent of the rail (e.g., ±6V). The first, transition is indicative of the leading edge (or other portion) of the first detected magnetic segment 86 of the intermittent-magnetic thread 84, as will be explained further with respect to FIGS. 8*a-d*.

If the first transition has not exceeded the predetermined threshold, the scan head 610 continues to sense the flux of passing currency bills 80 and the threshold circuit 656 continues to monitor the generated voltage at step 418. Once the first transition has been detected, the digital circuit 660 begins to track the counts provided by the encoder 644 and thereby to measure the length of a magnetic segment. By utilizing the encoder 644 count to track the magnetic and nonmagnetic segments 86, 88, the currency processing device 600 is able to process the currency bills 80 independent of the speed of a transport mechanisms. Thus, the scan head 610 incorporated into the currency processing device 600 is able to process documents both at extremely high speeds as well as extremely low speeds.

The digital circuit 660 continues to track the counts by the encoder 644, at step 426, until a determination is made at decision box 430 that a pulse—of opposite polarity from the first transition pulse—has exceeded a predetermined threshold voltage (e.g., −6V). This opposite-polarity pulse designates the transition from a magnetic segment 86 to a nonmagnetic segment 88. Therefore, the counts by the encoder 644 during the interim period between the detection of the initial threshold current and the opposite-polarity threshold current represents the length of the first magnetic segment 86 on the intermittent-magnetic thread 84.

Once the determination has been made that the opposite-polarity pulse has been detected, the digital circuit 660 stores the tracked counts in the memory 664, at step 434. The digital circuit 660 again tracks the counts provided by the encoder 644, at step 438. However, the newly tracked count represents a nonmagnetic segment 88, as opposed to the previously tracked magnetic segment 86. The digital circuit 660 continues to track the encoder 644 counts until the next transition threshold, of opposite polarity, occurs. Once the determination has been made at decision box 442 that the next transition pulse has exceeded the threshold voltage (e.g., +6V), the encoder counts for the nonmagnetic section 88 of the intermittent-magnetic thread 84 are stored in the memory 664 at step 446. The digital circuit 660 tracks the counts provided by the encoder 644, at step 450, representing the length of a second magnetic segment 86 of the intermittent-magnetic thread 84.

The digital circuit 660 continues to track the counts by the encoder 644, at step 450, until a determination is made at decision box 454 that a pulse—of opposite polarity from the first transition pulse—has exceeded the predetermined threshold voltage (e.g., −6V). This opposite-polarity pulse designates the transition from a second magnetic segment 86 to a second nonmagnetic segment 88. The digital circuit 660 stores the tracked counts for the second magnetic segment 86 in the memory 664, at step 458. The above process continues until the intermittent-magnetic thread 84 has been entirely scanned, or in alternative embodiments, until a predetermined length or number of segments have been scanned.

Once the determination is made at decision box 462 that the scan for the particular currency bill 80 is complete, the lengths represented by the stored counts are compared to the standard lengths for valid currency at step 470. It should be understood that the stored counts are directly representative of a length, as the encoder 644 is adapted to provide a single count when the encoder 644 has rotated a specific distance. This distance represents the distance traveled by the currency bill 80 through the currency processing device, as the encoder 644 is integrated into the transport mechanism. The standard segment lengths for various currency may be stored in the memory 668 in the form of a look-up table. According to some embodiments, the look-up table includes the standard lengths for the magnetic and/or nonmagnetic segments 86, 88 of the intermittent-magnetic thread 84 for each denomination of currency that is to be accommodated by the currency processing device 600.

If the lengths of the magnetic and nonmagnetic segments 86, 88 do not favorably compare with the master data, the currency bill 80 is flagged as a nonconforming document by notifying (e.g., sending an error signal to) the microprocessor 640 at step 482. The microprocessor 640 may then determine whether to off-sort the nonconforming document to an alternative output receptacle (if any), whether to stop the currency processing device 600 with the nonconforming document on top of the stack in the output receptacle 624, stop the currency processing device 600 with the nonconforming document in a predetermined or known location, or continue processing the plurality of currency bills 80. Alternatively, if the length data sufficiently agrees with or matches the master data, the currency bill 80 is determined to be authentic and/or the denomination information is sent from the digital circuitry 660 to the microprocessor 640 at step 474. The processed currency bill 80 is then fed to the output receptacle 624 at step 478 and the next document is scanned as discussed above.

The sensitivity of the device can be adjusted by changing the allowed deviation between the determined length (or count) information of the document being processed and the stored master length (or count) information in memory such as in a look-up table. As the allowed deviation is reduced, the sensitivity of the device is increased. U.S. Pat. No. 5,909,503, further discusses setting the sensitivity of a currency processing device and is incorporated herein by reference in its entirety.

As discussed above, by utilizing the encoder 644 count to track the magnetic and nonmagnetic segments 36, 88, the currency processing device 600 is able to process the currency bills 80 independent of the speed of a transport mechanism (e.g., 310). Thus, a scan head incorporated into a currency processing device is able to process documents both at extremely high speeds as well as extremely low speeds.

For example, according to some embodiments, a transport mechanism is able to transport currency bills 80 at a low speed of approximately 0.002 inches per second (approximately 0.05 mm per second) to a maximum speed of about 100 inches per second (about 254 cm per second). These speeds translate to a typical processing speed of less than 1 bill per minute to about 2000 notes per minute. The scan head 10 of the present invention is able to process currency bills 80 throughout this range. Additionally, because transport mechanisms are continually being developed that attempt to transport currency bills at even higher speeds, it should be noted that the scan head 10 of the present invention is adapted to process bills at higher speeds as well. It is believed that, if a proper transport mechanism were developed, the integrated scan head 10 of the present invention could easily process at speeds of about 500 inches per second (about 1270 cm per second), which translates to about 10,000 notes per minute.

The above process has been specifically detailed for an intermittent-magnetic thread 84 having at least two magnetic segments 86 and at least one nonmagnetic segment 88 separating the two magnetic segments 86. It should be understood, however, that the present invention is operational on intermittent-magnetic threads 84 having any number of magnetic and nonmagnetic segments 86, 88 of various sizes, shapes, and locations. Additionally, it should be understood that the present invention is not limited to intermittent-magnetic threads but can be utilized to analyze any magnetic document so long as the coercivity of the magnetic portions of the document is such that the document is capable of being magnetized for an adequate length of time to sufficiently analyze the documents. It should also be noted that additional processing, evaluating, authenticating, and/or denominating techniques, scan heads, and sensors may be used in combination with the above-described scan head and process.

Figures 8A, 8B, 8C, 8D:
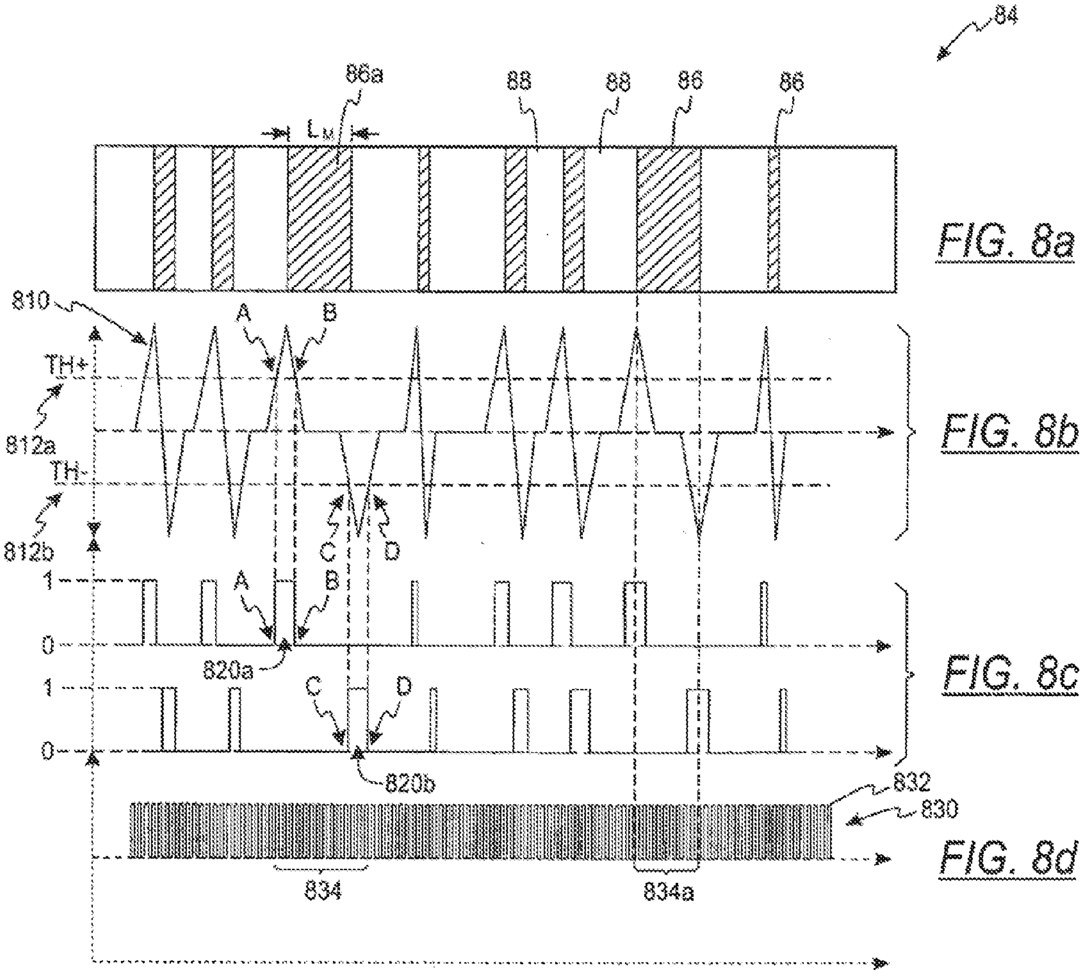
FIGS. 8*a-d* illustrate a digitization method for an analog magnetic signal generated by a magnetic sensor sensing a magnetic element, according to one embodiment of the present invention.

Turning now to FIGS. **8*a-d*, a digitization method for an analog magnetic signal without using an ADC will be further illustrated, according to some embodiments of the present invention. FIG. 8*a* illustrates an intermittent-magnetic element, such as intermittent-magnetic thread 34 that has been magnetized by a magnetization member (e.g., magnetization member 618) producing a substantially constant magnetic field. The intermittent-magnetic thread 84 includes both magnetic and nonmagnetic segments 86, 88, respectively. FIG. 8*b*** illustrates an example of an analog output signal 810 from a magnetic sensor, such as the magnetic sensor 612. According to one embodiment, the threshold voltage for the one or more comparators in a threshold circuit (e.g., the threshold circuit 656) is ±6V. The threshold circuit monitors both a positive threshold voltage 812*a* and a negative threshold voltage 812*b*.

As illustrated in FIG. 8*b*, as one of the magnetic segments 86*a* of the intermittent-magnetic thread 84 approach the magnetic sensor, the magnetic sensor outputs a nonzero voltage. As each of the magnetic segments 86 further approach the magnetic sensor, the voltage output of the magnetic sensor increases (or, in some embodiments, decreases) until eventually reaching the positive threshold voltage 812*a* (or, in some embodiments, the negative threshold voltage 812*b*) at point A. At least one of the comparators in the threshold circuit detects that the output voltage has reached the positive threshold voltage 812*a* and generates a positive output voltage representing a binary 1 in some embodiments. The output signals 820*a*, 820*b* of the one or more comparators is illustrated in FIG. 8*c*, according to one embodiment.

A digital circuit (e.g., the digital circuit 660) begins tracking a number of counts 832 generated by an encoder output 830 illustrated in FIG. 8*d*. As the intermittent-magnetic thread 84 continues to move in the transport direction, the middle of the magnetic segment 86*a* approaches the magnetic sensor, causing the voltage of the analog output signal 810 of the magnetic sensor to decrease (or, in some embodiments, increase). Once the analog output signal 810 has been reduced (or, in some embodiments, increased) below the threshold voltage, at point B, the positive output voltage of the output signal 820*a* returns to zero, representing a binary 0 in some embodiments. The digital circuit continues to track the number of counts 832 generated by the encoder output 830.

As the intermittent-magnetic thread 84 continues to move in the transport direction, the middle of the magnetic segment 86*a* aligns with the magnetic sensor causing the analog output signal 810 of the magnetic sensor to go to essentially zero. The intermittent-magnetic thread 84 continues to move in the transport direction and the middle portion of the magnetic segment 86*a* begins to move away from the magnetic sensor, causing the voltage of the analog output signal 810 to decrease further (or, in some embodiments, increase further). Once the analog output signal 810 has been reduced (or, in some embodiments, increased) below the negative threshold voltage (or, in some embodiments the positive threshold voltage) at point C, at least one of the comparators in the threshold circuit detects that the output voltage has reached the negative threshold voltage 812*b* and generates a positive output voltage 820*b* representing a binary 1 in some embodiments.

As the intermittent-magnetic thread 84 continues to move in the transport direction, the magnetic segment 86*a* moves away from the magnetic sensor, causing the voltage of the analog output signal 810 of the magnetic sensor to increase (or, in some embodiments, decrease). Once the analog output signal 810 has been increased (or, in some embodiments, reduced) below the threshold voltage, at point D, the positive output voltage of the output signal 820*b* returns to zero, representing a binary 0 in some embodiments. In one embodiment, the digital circuit ceases tracking the number of counts 832 generated by the encoder output 830.

The number of counts 832 in the tracked group 834 of counts 832 is determined by the digital circuit. The number of counts 832 in the tracked group 834 can then be compared to master data stored in a memory. The number of counts 832 in the tracked group 834 is indicative of the length ($L_m$) of the magnetic segment 86*a* of the intermittent-magnetic thread 84.

According to one embodiment of the present invention, the digital circuit tracks the number of encoder counts 832 from point A through point B. According to another embodiment, the digital circuit tracks the number of encoder counts 832 from point A through point C. According to still another embodiment, the digital circuit tracks the number of encoder counts 832 from point B through point D. According to yet another embodiment, the digital circuit tracks the number of encoder counts 832 from a median, point of points A and B through a median point of points C and D, such as in tracked group 834*a*. In the various embodiments, the master data is obtained from known genuine documents between the same points used by the digital circuit.

Turning now to FIGS. 9*a-e*, a digitization method for an analog magnetic signal without using an ADC will be further illustrated, according to one embodiment of the present invention. FIG. 9*a* illustrates an intermittent-magnetic element, such as intermittent-magnetic thread 84 prior to being magnetized by a magnetization member (e.g., magnetization member 618). FIG. 9*b* illustrates a magnetically-encoded, intermittent-magnetic thread 85 having at least one magnetically-encoded, magnetic segment 87. The magnetically-encoded, intermittent-magnetic thread 83 is formed, according to some embodiments, by magnetizing the intermittent-magnetic thread 84 with a magnetization member that produces an alternating or variable magnetic field. As illustrated in FIG. 9*b*, one or more first portions 87*a* of the magnetically-encoded, magnetic segment 87 has a magnetization in a first direction, represented by Arrow A. One or more second portions 87*b* of the magnetically-encoded, magnetic segment 87 has a magnetization in a second direction, represented by Arrow B. According to some embodiments, the first direction is substantially opposite the second direction.

An analog signal 910 from a magnetic sensor (e.g., magnetic sensor 612) passes through an amplifier circuit, which may include a bandpass filter. The bandpass filter is tuned/optimized to recognize the frequency of the pattern of the magnetically-encoded, magnetic segments 87. The filtered analog signal is then sent to the threshold circuit, which includes a comparator. Generally, the output from the bandpass filter is essentially zero when a nonmagnetic portion 88 of the magnetically-encoded, intermittent-magnetic thread 85 passes by the magnetic sensor. Alternatively, the output from the bandpass filter is generally of a certain nonzero amplitude when a magnetically-encoded, magnetic segment 87 is sensed by the magnetic sensor.

Once a threshold detector detects the output from the bandpass filter to have exceeded a predetermined threshold, an output voltage 920 is generated by the threshold detector, which, in some embodiments, represents a binary 1. A digital circuit recognizes the output voltage 920 and begins to track the number of counts 932 generated by an encoder output 930. As discussed above with respect to FIGS. 8*e-d*, the number of counts 932 in a tracked group 934 is indicative of the length ($L_m$) of the magnetically-encoded, magnetic segment 87 of the magnetically-encoded, intermittent-magnetic thread 85.

While the embodiments discussed in this patent have focused on the denomination of currency bills, according to alternative embodiments, this invention is applicable to the authentication, discrimination, evaluation, examination, differentiation, verification, identification, or recognition of any article having a magnetic security feature, such as, for example, banking documents, travel documents, checks, deposit slips, coupons and loan payment documents, food stamps, cash tickets, savings withdrawal tickets, check deposit slips, savings deposit slips, traveler checks, lottery tickets, casino tickets, passports, visas, driver licenses, and/or all other documents utilized as a proof of deposit at financial institutions.

While the invention is susceptible to various modifications and alternative forms, specific embodiments and methods thereof have been shown by way of example in the drawings and are described in detail herein. It should be understood, however, that it is not intended to limit the invention to the particular forms or methods disclosed, but, to the contrary, the intention is to cover all modifications, equivalents, and alternatives falling within the spirit and scope of the invention and the appended claims.

Alternative Embodiment A

A document processing device for processing a plurality of documents having a magnetic feature, the document processing device comprising:

a magnetization member adapted to create a magnetic field of sufficient strength to magnetize a magnetic feature of each of a plurality of documents;

a magnetic sensor having a continuous track width of greater than about 50 millimeters, the magnetic sensor being adapted to produce a linear, analog output signal in response to the plurality of magnetic features moving past the magnetic sensor;

a transport mechanism adapted to move the plurality of documents past the magnetization member and the magnetic sensor, the transport mechanism including an encoder adapted to provide positional data;

at least one comparator adapted to detect when the analog output of the magnetic sensor exceeds a threshold value; and at least one digital circuit adapted to record the positional data provided by the encoder, the at least one digital circuit recording the positional data in response to the analog output signal of the magnetic sensor exceeding the threshold value.

Alternative Embodiment B

The document processing device of Alternative Embodiment A, wherein the magnetization member is a permanent magnet.

Alternative Embodiment C

The document processing device of Alternative Embodiment A, wherein the magnetization member is an electromagnetic device.

Alternative Embodiment D

The document processing device of Alternative Embodiment A, wherein the magnetization member is a combination of a permanent magnet-and an electromagnetic device.

Alternative Embodiment E

The document processing device of Alternative Embodiment A, wherein the magnetization member is adapted to create a constant magnetic field.

Alternative Embodiment F

The document processing device of Alternative Embodiment A, wherein the magnetization member is adapted to create an alternating magnetic field.

Alternative Embodiment G

The document processing device of Alternative Embodiment F, wherein the magnetization member is adapted to encode a pattern on the magnetic feature.

Alternative Embodiment H

The document processing device of Alternative Embodiment G, further comprising: a bandpass filter timed to recognize a frequency of the pattern encoded by the magnetization member into the magnetic feature.

Alternative Embodiment I

The document processing device of Alternative Embodiment A, wherein the magnetic sensor is a magneto-resistive field sensor.

Alternative Embodiment J

The document processing device of Alternative Embodiment A, wherein the threshold value is a predetermined voltage.

Alternative Embodiment K

The document processing device of Alternative Embodiment A, wherein the magnetic sensor includes a nonmagnetic substrate having a thin-film sensing element deposited thereon.

Alternative Embodiment L

The document processing device of Alternative Embodiment A, wherein the magnetic sensor is a half-bridge configuration.

Alternative Embodiment M

The document processing device of Alternative Embodiment A, wherein the magnetic sensor is a full-bridge configuration.

Alternative Embodiment N

The document processing device of Alternative Embodiment A, wherein the magnetization member is incorporated into the magnetic sensor.

Alternative Embodiment O

The document processing device of Alternative Embodiment A, wherein the magnetization member is located upstream from the magnetic sensor.

Alternative Embodiment P

The document processing device of Alternative Embodiment O, wherein the magnetization member is located sufficiently far upstream from the magnetic sensor to avoid interfering with the magnetic sensor.

Alternative Embodiment Q

The document processing device of Alternative Embodiment A, wherein the magnetic feature is a magnetic thread.

Alternative Embodiment R

The document processing device of Alternative Embodiment A, wherein the magnetic feature is an intermittent-magnetic thread.

Alternative Embodiment S

The document processing device of Alternative Embodiment R, wherein the intermittent-magnetic thread includes highly magnetized and lesser magnetized segments.

Alternative Embodiment T

The document processing device of Alternative Embodiment R, wherein the intermittent-magnetic thread includes magnetic segments and nonmagnetic segments.

Alternative Embodiment U

The document processing device of Alternative Embodiment T, wherein the magnetization member is adapted to encode pattern on the magnetic segments of the intermittent-magnetic thread.

Alternative Embodiment V

The document processing device of Alternative Embodiment A, wherein the plurality of documents is a plurality of currency bills.

Alternative Embodiment W

The document processing device of Alternative Embodiment V, wherein the positional data for the magnetic feature is utilized to denominate the currency bills.

Alternative Embodiment X

The document processing device of Alternative Embodiment V, wherein the positional data for the magnetic feature is utilized to authenticate the currency bills.

Alternative Embodiment Y

The document processing device of Alternative Embodiment V, wherein the positional data for the magnetic feature is utilized to denominate and authenticate the currency bills.

Alternative Embodiment Z

The document processing device of Alternative Embodiment A, wherein the magnetic sensor has a scan width of greater than about 60 millimeters Alternative Embodiment AA A method for processing a plurality of documents having at least one magnetic feature, the method comprising the acts of:

magnetizing the plurality of at least one magnetic features;

sensing a flux of each of the plurality of documents, the flux being sensed by a magnetic sensor;

generating an analog signal along a single channel, the analog signal being generated by the magnetic sensor as the plurality of documents are in close proximity to the magnetic sensor, the analog signal being representative of the sensed flux;

monitoring with at least one comparator the generated analog signal along the single channel to determine whether a threshold voltage has been exceeded;

digitizing the analog signal by generating an output voltage in response to the threshold voltage being exceeded, the output voltage being independent of the analog signal, the analog signal being digitized without the use of an analog-to-digital converter.

The invention claimed is:

1. A method for processing a plurality of documents having at least one magnetic feature, the method comprising the acts of:

- magnetizing the at least one magnetic feature, the magnetic feature including a magnetic security thread incorporating a magnetic ink;
- sensing a flux of each of the plurality of documents, the flux being sensed by a magnetic sensor having a continuous track width of greater than about 50 millimeters, the magnetic ink thread located within the track width and being substantially perpendicularly oriented to the track width;
- generating an analog signal along a single channel, the analog signal being generated by the magnetic sensor as the plurality of documents are in close proximity to the magnetic sensor, the analog signal being representative of the sensed flux;
- monitoring the generated analog signal along the single channel with at least one comparator to determine whether a threshold voltage has been exceeded; and
- digitizing the analog signal by generating an output voltage in response to the threshold voltage being exceeded, the output voltage being independent of the analog signal, the analog signal being digitized without the use of an analog-to-digital converter.

2. The method of claim 1, wherein the magnetizing creates an alternating magnetic field encoding a pattern on the at least one magnetic features.

3. The method of claim 2, wherein a bandpass filter is tuned to recognize a frequency of the pattern encoded by a magnetization member into the magnetic feature.

4. The method of claim 1, wherein the magnetic sensor is a magneto-resistive field sensor.

5. The method of claim 1, wherein the magnetic sensor includes a nonmagnetic substrate having a thin-film sensing element deposited thereon.

6. The method of claim 1, wherein the magnetizing is performed by a permanent magnet.

7. The method of claim 1, wherein the magnetizing is performed by an electromagnetic device.

8. The method of claim 1, wherein the magnetizing includes creating a constant magnetic field.

9. The method of claim 1, wherein the magnetizing is performed by a magnetization member located upstream from a magnetic sensor performing the sensing.

10. The method of claim 1, wherein the magnetic feature is an intermittent-magnetic thread.

11. The method of claim 1, wherein the plurality of documents is a plurality of currency bills.

12. The method of claim 11, further comprising moving the plurality of documents past a magnetization member and providing encoded positional data to denominate the currency bills.

13. The method of claim 11, further comprising moving the plurality of documents past a magnetization member and providing encoded positional data to authenticate the currency bills.

14. A currency processing method comprising:

- receiving a stack of currency bills in an input receptacle of a currency processing device, each currency bill having at least one magnetic intermittent thread including a magnetic ink having data magnetically encoded thereon, the data encoded over the length of the thread based on the intermittency of a magnetic pattern in the security thread;
- transporting the currency bills, one at a time, from the input receptacle along a transport path;
- magnetizing the at least one magnetic ink thread of each currency bill as the bills are being transported;
- sensing flux from the magnetic ink threads of the currency bills using a single-channel wide-track magnetic sensor, the track having a track width of greater than about 50 millimeters, the magnetic security thread located within the track width and being substantially perpendicularly oriented to the track width; and
- the magnetic sensor generating a single, analog output signal along a single data channel in response to the plurality of magnetic threads moving past the magnetic sensor.

15. The method of claim 14 further comprising determining the denomination of the currency bills based on the data magnetically encoded on the magnetic thread of each bill.

16. The method of claim 14 further comprising authenticating each of the currency bills based on the data magnetically encoded on the magnetic thread of each bill.

17. The method of claim 16 comprising transporting bills at a rate in excess of 800 bills per minute and authenticating the currency bills based on the data magnetically encoded on the magnetic thread of each bill at a rate in excess of 800 bills per minute.

18. The method of claim 14 comprising transporting bills at a rate in excess of 800 bills per minute and determining the denomination of the currency bills based on the data magnetically encoded on the magnetic thread of each bill at a rate in excess of 800 bills per minute.

* * * * *

UNITED STATES PATENT AND TRADEMARK OFFICE

CERTIFICATE OF CORRECTION

PATENT NO. : 8,684,157 B2
APPLICATION NO. : 13/677985
DATED : April 1, 2014
INVENTOR(S) : Jay D. Freeman et al.

It is certified that error appears in the above-identified patent and that said Letters Patent is hereby corrected as shown below:

On the Title Page, Item (72) Inventors, replace “Encenitas”, the city for Inventor Jay D. Freeman, with --Encinitas--.

Signed and Sealed this
Twenty-sixth Day of August, 2014

Michelle K. Lee
*Deputy Director of the United States Patent and Trademark Office*